(12) United States Patent
Kano

(10) Patent No.: US 9,105,900 B2
(45) Date of Patent: Aug. 11, 2015

(54) BATTERY PACK, ELECTRICITY ACCUMULATION SYSTEM, ELECTRONIC INSTRUMENT, ELECTRIC VEHICLE, AND ELECTRIC POWER SYSTEM

(75) Inventor: Hiroshi Kano, Fukushima (JP)

(73) Assignee: SONY CORPORATION, Tokyo (JP)

( * ) Notice: Subject to any disclaimer, the term of this patent is extended or adjusted under 35 U.S.C. 154(b) by 406 days.

(21) Appl. No.: 13/614,602

(22) Filed: Sep. 13, 2012

(65) Prior Publication Data

US 2013/0082659 A1    Apr. 4, 2013

(30) Foreign Application Priority Data

Sep. 29, 2011    (JP) .................................. 2011-213773

(51) Int. Cl.
*H02J 7/00*     (2006.01)
*H01M 2/10*    (2006.01)

(52) U.S. Cl.
CPC ..................................... *H01M 2/105* (2013.01)

(58) Field of Classification Search
CPC ................................... H02J 7/00; H01M 2/105
USPC .......................... 320/107–115, 128, 135–137
See application file for complete search history.

(56) References Cited

U.S. PATENT DOCUMENTS

2010/0156350 A1*   6/2010   Murayama et al. ........... 320/128

FOREIGN PATENT DOCUMENTS

JP          2006-164655          6/2006

* cited by examiner

*Primary Examiner* — Paul Dinh
(74) *Attorney, Agent, or Firm* — K&L GATES LLP

(57) ABSTRACT

Provided is a battery pack including: an exterior case formed with one or more hole sections; a battery cell in which a positive electrode terminal section is formed on one end surface thereof and a negative electrode terminal section is formed on the other end surface thereof; a battery holder having a plurality of battery cell receiving sections receiving the battery cell; and a metal plate joined to the battery holder and formed with a terminal contact section.

13 Claims, 16 Drawing Sheets

A

B

A

B

21a

21a

A

B

A

B

A

B

A

B

A

B

BATTERY PACK, ELECTRICITY ACCUMULATION SYSTEM, ELECTRONIC INSTRUMENT, ELECTRIC VEHICLE, AND ELECTRIC POWER SYSTEM

CROSS REFERENCES TO RELATED APPLICATIONS

The present application claims priority to Japanese Priority Patent Application JP 2011-213773 filed in the Japan Patent Office on Sep. 29, 2011, the entire content of which is hereby incorporated by reference.

BACKGROUND

The present disclosure relates to a battery pack that can be applied to an electronic instrument, an electric vehicle, an electric tool or the like. Furthermore, the present disclosure relates to an electricity accumulation system to which the battery pack is applied, an electronic instrument, an electric vehicle, and an electric power system.

A lithium ion secondary battery using doping and de-doping of lithium ions has been used. A plurality of battery cells (also referred to as single batteries or cells) of the lithium ion secondary battery are connected to form a battery cell group. The battery cells constituting the battery cell group are connected to each other to form a battery module. One or more battery modules are housed in an exterior case to form a battery pack. The battery pack of the lithium ion secondary battery has been widely used in electronic instruments such as personal computers and mobile phones, electric vehicles, electric tools or the like.

When moisture enters the battery pack, it causes breakdown of a battery cell. Accordingly, it is desirable to improve waterproofing properties of the battery pack. As mentioned below, Japanese Patent Laid-open Publication No. 2006-164655 discloses a battery pack which seals a case receiving the battery cell to prevent moisture from entering from the outside.

SUMMARY

When using the battery pack, the battery cell generates heat. For this reason, it is desirable to provide a hole section in the case to take in air from the outside via the hole section. The battery cell can be cooled by air taken from the outside. However, in the battery pack described in Japanese Patent Laid-open Publication No. 2006-164655, a sealing structure using the case is adopted so as to improve waterproofing properties. For this reason, the hole section taking in air may not be provided in the case.

Thus, an object of the present disclosure is to provide a battery pack with improved waterproofing properties.

In order to solve the problems mentioned above, according to an embodiment of the present disclosure, for example, there is provided a battery pack which includes an exterior case formed with one or more hole sections, a battery cell in which a positive electrode terminal section is formed on one end surface thereof and a negative electrode terminal section is formed on the other end surface thereof, a battery holder having a plurality of battery cell receiving sections receiving the battery cell, and a metal plate joined to the battery holder and formed with a terminal contact section, wherein an end of the battery cell receiving section is opened, and an end section having an opening is formed in the other end of the battery cell receiving section, an elastic body having an opening is placed between the one end surface of the battery cell and the end section of the battery cell receiving section, a predetermined portion of the elastic body is constricted by an end surface near the positive electrode terminal section and an inner surface of the end section, and a portion of the elastic body exposed from the opening of the battery cell receiving section is constricted by the positive electrode terminal section and the metal plate near the terminal contact section.

An electricity accumulation system in which the battery pack is charged by a power generator that performs power generation from renewable energy may be provided.

An electricity accumulation system that supplies electric power to an electronic instrument connected to the battery pack may be provided.

An electronic instrument that is supplied with electric power from the battery pack may be provided.

An electric vehicle which has a conversion device that is supplied with electric power from the battery pack and converts the electric power into driving force of a vehicle, and a control device that performs information processing about a vehicle control based on information about the battery pack may be provided.

An electric power system which includes an electric power information transmission and reception section that transmits and receives signals to and from another instrument via a network and performs charging and discharging control of the battery pack based on information received by the electric power transmission and reception section may be provided.

An electric power system which is supplied with electric power from the battery pack or supplies electric power to the electricity accumulation system from the power generator or a power network may be provided.

According to at least one embodiment, waterproofing properties of the battery pack can be improved.

Additional features and advantages are described herein, and will be apparent from the following Detailed Description and the figures.

DETAILED DESCRIPTION

Figure 1:
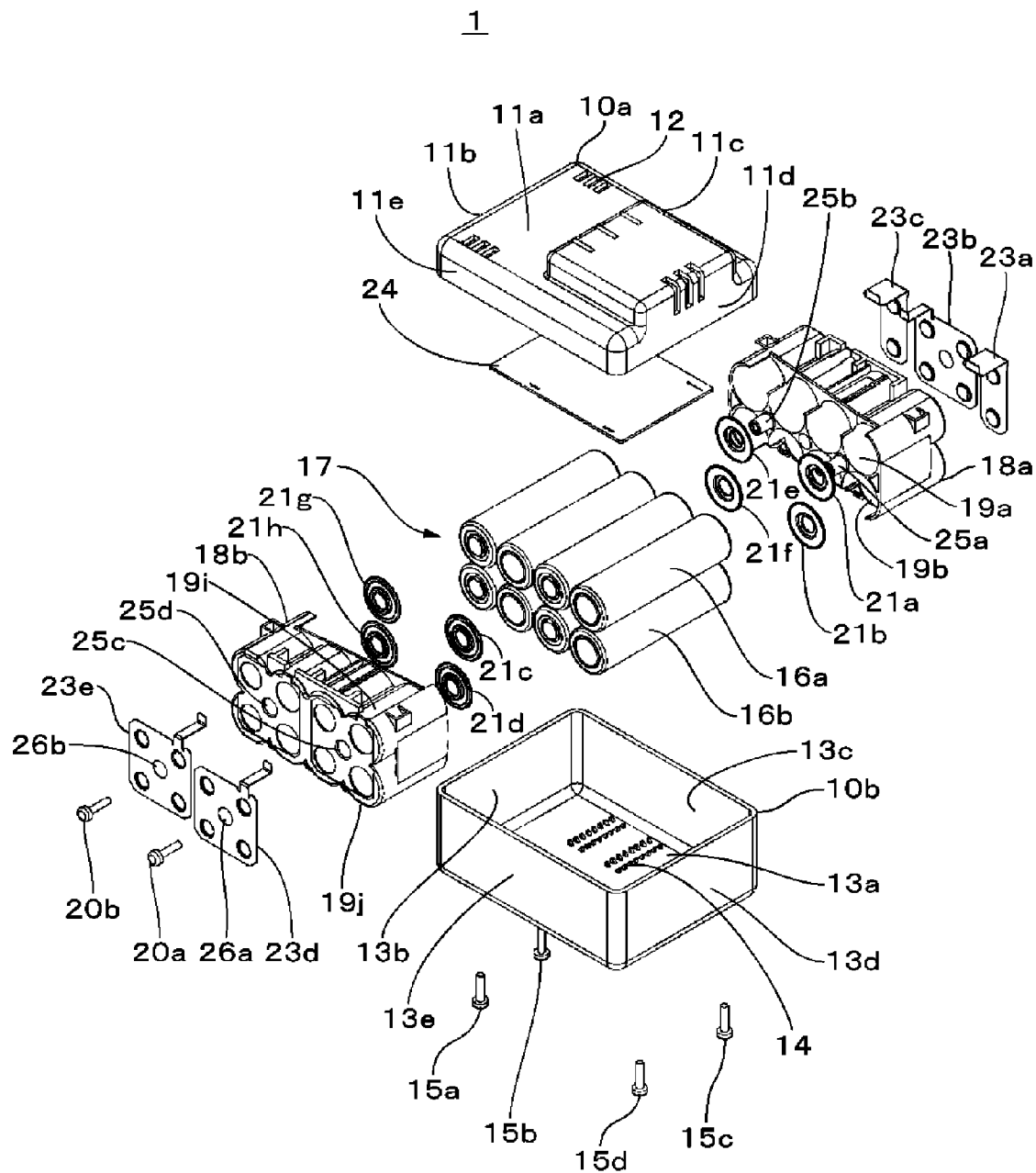
FIG. 1 is an exploded perspective view for describing an example of a configuration of a battery pack.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present disclosure will be described with reference to the drawings. In addition, the description will be made in the sequence mentioned below.
<1. First Embodiment>
<2. Modified Example>
<3. Application Example>

In addition, the present disclosure is not limited by the embodiment or the like mentioned below. In the embodiments mentioned below, although directions such as front, back, left, right, up and down are indicated in consideration of convenience of the description, the contents of the present disclosure are not limited to such directions.

1. First Embodiment

"Configuration of Battery Pack"

Firstly, an outline of a configuration of a battery pack will be described. The outline of the configuration of the battery pack is as below. The battery pack has a battery cell group constituted by a plurality of battery cells. The individual battery cells of the battery cell group are inserted into a battery cell receiving section of a battery holder. A terminal contact section of a metal plate is joined to a positive electrode terminal section or a negative electrode terminal section of the battery cells, and the respective battery cells are electrically connected to each other by the metal plate. A battery block is formed by the electrical connection of the respective battery cells. One or more battery blocks are connected to a substrate to form an electric circuit. Also, the battery block, the substrate and the like are received in an exterior case to form a battery pack. In addition, one or more connected battery blocks are also referred to as a battery module or the like.

For example, the battery pack is used in an electric tool. Of course, the battery pack can be used in various electronic instruments such as a personal computer, a home electric instrument such as a vacuum cleaner and a refrigerator, an electric vehicle, a power supply device for backup use and emergency use. In this manner, the battery pack is used over a wide range of applications. The configuration of the battery pack, for example, the number and a connection shape of the battery cell, and a shape of the exterior case, can be suitably changed depending on the application of the exemplified battery pack. Hereinafter, the details of the battery pack exemplified in the present disclosure will be described.

FIG. 1 is an exploded perspective view for describing a configuration example of a battery pack in a first embodiment. A battery pack 1 has, for example, an exterior upper case 10a and an exterior lower case 10b formed of resin. The exterior upper case 10a has a substantially rectangular upper surface plate 11a. A side plate 11b, a side plate 11c, a side plate 11d, and a side plate 11e are erected downward around the upper surface plate 11a. The side plate 11b, the side plate 11c, the side plate 11d, and the side plate 11e are formed to be somewhat shallow. In order to provide satisfactory heat dissipation properties of battery cells received in the exterior upper case 10a and the exterior lower case 10b, for example, a heat dissipation hole portion 12 is formed in the exterior upper case 10a.

In order to make heat dissipation characteristics of the battery pack satisfactory, for example, an exterior upper case 10a is formed with a hole section 12 for heat dissipation. The battery cell can be air-cooled by air taken in from the hole section 12. The hole section 12 may be formed in an exterior lower case 10b. In addition, the hole section 12 may be formed in the exterior upper case 10a and the exterior lower case 10b. A plurality of hole sections 12 may be formed.

By providing the hole section 12, moisture, other liquids or the like can easily flood into the battery pack 1 from the outside. However, as will be described below, it is possible to prevent the flooding into the battery cell in the battery pack 1. Thus, it is possible to prevent the battery pack 1 from breaking down and deteriorating due to moisture flooding in from the hole section 12.

The exterior lower case 10b has a substantially rectangular bottom plate 13a. A side plate 13b, a side plate 13c, a side plate 13d and a side plate 13e are erected upward from a periphery of the bottom plate 13a. The side plate 13b, the side plate 13c, the side plate 13d and the side plate 13e are formed to be somewhat deep. On an inner surface of the bottom plate 13a, a plurality of protrusions 14 are formed so as to be arranged in a longitudinal direction of a battery cell to be described later. The protrusions 14 may not be necessary.

Screw fastening hole sections (not shown) are formed in the exterior upper case 10a and the exterior lower case 10b. A screw 15a, a screw 15b, a screw 15c and a screw 15d are inserted into the hole section of the exterior lower case 10b to be rotated. The screws 15a, 15b, 15c and 15d penetrate the hole sections of the exterior lower case 10b and reach the hole sections of the exterior upper case 10a. In addition, the respective screws are rotated and fastened, and thus the exterior upper case 10a is fixed to the exterior lower case 10b.

A battery cell group 17 or the like formed of a plurality of battery cells 16 is received in the exterior upper case 10a and the exterior lower case 10b. The battery cell 16 is, for example, a cylindrical lithium ion secondary battery. The battery cell 16 may be another secondary battery such as a lithium ion polymer secondary battery. In addition, the shape of the battery cell 16 may have other shapes such as a square shape without being limited to the cylindrical shape. A positive electrode terminal section is formed in an end of the battery cell 16, and a negative electrode terminal section is formed in the other end of the battery cell 16.

The plurality of battery cells 16 are placed so as to form one row or a plurality of rows. In an example shown in FIG. 1, eight battery cells including a battery cell 18a, a battery cell 16b, a battery cell 16c, . . . a battery cell 16h (when there is no need to distinguish the battery cells, they are referred to as a battery cell 16) are placed so as to form two rows of four. In FIG. 1, in order to simplify the illustration, only the battery cell 16a and the battery cell 16b are denoted by reference numerals.

In an end portion of the battery cell group 17, the battery cell 16a and the battery cell 16b are placed in a stacked manner. The battery cell 16c and the battery cell 16d are placed adjacent to the battery cell 16a and the battery cell 16b in a stacked manner. The battery cell 16e and the battery cell 16f are placed are placed adjacent to the battery cell 16c and the battery cell 16d in a stacked manner. The battery cell 16g and the battery cell 16h are placed are placed adjacent to the battery cell 16e and the battery cell 16f in a stacked manner.

The battery cells adjacent to each other in a vertical direction are each placed so that the positive electrode terminal section and the negative electrode terminal section are aligned in the same direction. For example, the battery cells are placed so that the positive electrode terminal section of the battery cell 16a and the positive electrode terminal section of the battery cell 16b are aligned in the same direction. The battery cells adjacent to each other in a longitudinal direction are placed so that the positive electrode terminal section and the negative electrode terminal section are aligned in different directions from each other. For example, the positive electrode terminal section of the battery cell 16a and the positive electrode terminal section of the battery cell 16c are placed so as to face different directions from each other. In addition, the placement form of the battery cells is an example but is not limited to the exemplified placement form. For example, the battery cells may be placed so that the positive electrode terminal sections of the entire battery cells are aligned in the same direction.

The battery cell group 17 is fixed by a battery holder 18a and a battery holder 18b. For example, the battery holder 18a and the battery holder 18b have substantially the same shape. The battery holder 18a and the battery holder 18b may have different shapes from each other.

Battery cell receiving sections are formed in each of the battery holder 18a and the battery holder 18b. For example, a battery cell receiving section 19a, a battery cell receiving section 19b, a battery cell receiving section 19c, . . . , and a battery cell receiving section 19h are formed in the battery holder 18a. For example, a battery cell receiving section 19i, a battery cell receiving section 19j, a battery cell receiving section 19k, . . . , and a battery cell receiving section 19p are formed in the battery holder 18b. In addition, in FIG. 1, in order to simply the illustration, only the battery cell receiving section 19a, the battery cell receiving section 19b, the battery cell receiving section 19i, and the battery cell receiving section 19j are denoted by the reference numerals. When there is no need to distinguish the individual battery cell receiving sections, the battery cell receiving section is referred to as a battery cell receiving section 19.

The battery cell receiving section 19 has, for example, a hollow cylindrical shape. One end side of the battery cell receiving section 19 is opened, and thus one battery cell 16 can be inserted into the battery cell receiving section 19. In the other end of the battery cell receiving section 19, for example, a substantially circular end section is formed. The hollow side surface of the end section is an inner surface of the end section, and the opposite side surface is an outer surface of the end section. The end surface of the battery cell 16 abuts the inner surface of the battery cell receiving section 19, thus fixing the position of the battery cell 16 inserted from the open end of the battery cell receiving section 19.

In the end section of the battery cell receiving section 19, for example, a substantially circular opening is formed. The positive electrode terminal section or the negative electrode terminal section of the battery cell 16 is exposed from the opening formed in the end section. The respective battery cell receiving sections 19 are formed at predetermined intervals. Thus, it is possible to insulate between the battery cells 16 inserted into the respective battery cell receiving sections 19.

As materials of the battery holder 18a and the battery holder 18b, for example, an insulating material such as plastic can be adopted. The materials of the battery holder 18a and the battery holder 18b may be a thermally conductive material which contains metal powders or carbon and has high thermal conductivity, and heat generation from the battery cell 16 can be effectively dissipated to the outside using such a material. The materials of the battery holder 18a and the battery holder 18b may be reinforced plastic which contains fiberglass or carbon fiber and has excellent mechanical strength. By using such materials, it is possible to enhance mechanical strength of the battery holder 18a and the battery holder 18b against external impact.

The battery holder 18a is, for example, formed with a hole section 25a and a hole section 25b. The battery holder 18b is formed with a hole section 25c and a hole section 25d. A screw 20a is inserted into the hole section 25a and the hole section 25c and is rotated. A screw 20b is inserted into the hole section 25b and the hole section 25d and is rotated. The battery holder 18a and the battery holder 18b are fastened and fixed using, for example, the screw.

It is possible to reliably insulate between the battery cells by using the battery holder. For this reason, high stability can be obtained compared to a structure of the related art using an insulating tape or the like in which deviation of a sticking position easily occurs. In addition, since the battery cell is stably fixed to the battery cell receiving section of the battery holder, it is possible to prevent the position of the battery cell from deviating due to external impact.

A rubber ring 21 is placed between the positive electrode terminal section of the battery cell 16 and the battery cell receiving section 19. A rubber ring 21a is placed between the positive electrode terminal section of the battery cell 16a and the battery cell receiving section 19a. A rubber ring 21b is placed between the positive electrode terminal section of the battery cell 16b and the battery cell receiving section 19b. A rubber ring 21c is placed between the positive electrode terminal section of the battery cell 16c and the battery cell receiving section 19k. A rubber ring 21d is placed between the positive electrode terminal section of the battery cell 16d and the battery cell receiving section 19l.

A rubber ring 21e is placed between the positive electrode terminal section of the battery cell 16e and the battery cell receiving section 19e. A rubber ring 21f is placed between the positive electrode terminal section of the battery cell 16f and the battery cell receiving section 19f. A rubber ring 21g is placed between the positive electrode terminal section of the battery cell 16g and the battery cell receiving section 19O. A rubber ring 21f is placed between the positive electrode terminal section of the battery cell 16f and the battery cell receiving section 19p. In addition, when there is no need to distinguish the individual rubber rings, the rubber rings are referred to as the rubber ring 21.

The rubber ring 21 has, for example, a disk shape formed with a substantially circular hole section. Other shapes such as a rectangular shape may also be used. The size of the rubber ring 21, for example, a diameter, is set to be slightly smaller than that of the battery cell receiving section 19. Thus, the rubber ring 21 can be inserted into the battery cell receiving section 19. The diameter of the hole section of the rubber ring 21 is smaller than that of the opening of the end section of the battery cell receiving section 19. Thus, a part of the rubber ring 21 is exposed from the opening of the end section of the battery cell receiving section 19. When the battery cell 16 is inserted into the battery cell receiving section 19, the positive electrode terminal section of the battery cell 16 is exposed via the hole section of the rubber ring 21. A terminal contact section of a metal plate to be mentioned below is joined to the exposed positive electrode terminal section.

For example, the rubber ring 21a is received in the battery cell receiving section 19a. The rubber ring 21a is restricted and positioned by the inner surface of the battery cell receiving section 19a. At this time, a part of the rubber ring 21a and the positive electrode terminal section are exposed from the opening of the end section of the battery cell receiving section 19a. Moreover, the battery cell 16a is inserted into the battery cell receiving section 19a. A predetermined location of the rubber ring 21a is constricted in a crushed state (supported so as to be interposed) by the end section near the positive electrode terminal section of the battery cell 16a and the inner surface of the battery cell receiving section 19a. The terminal contact section of the metal plate to be mentioned below is inserted from the opening of the battery cell receiving section 19a. The inserted terminal contact section is joined to the positive electrode terminal section. At this time, a part of the rubber ring 21a is constricted in a crushed state by a peripheral location of the positive electrode terminal section and the metal plate near the terminal contact section.

The rubber ring 21 has elasticity and is deformed depending on pressure from the outside. As a material of the rubber ring, silicon, or a rubber-based material such as isoprene rubber, butadiene rubber, styrene rubber, isobutylene-isoprene rubber, or ethylene propylene rubber is used. If a material has elasticity and is deformed by pressure, the material is not limited to the rubber-based material.

The positive electrode terminal section or the negative electrode terminal section exposed from the openings of the respective battery cell receiving sections 19 is joined to the terminal contact sections formed in the respective metal plates. For example, the positive electrode terminal section or the negative electrode terminal section is joined to the terminal contact sections formed in the respective metal plates by resistance welding or laser beam heating welding. For example, two terminal contact sections having a substantially rectangular shape are formed in a vertical direction. The terminal contact sections are formed, for example, by drawing the metal plate 23a.

The positive electrode terminal section of the battery cell 16a is exposed from the opening of the end portion of the battery cell receiving section 19a. The positive electrode terminal section of the battery cell 16b is exposed from the opening of the end portion of the battery cell receiving section 19b. Thus, the upper terminal contact section of the metal plate 23a is joined to the positive electrode terminal section of the battery cell 16a. The lower terminal contact section of the metal plate 23a is joined to the positive electrode terminal section of the battery cell 16b.

For example, the metal plate 23b has a substantially rectangular shape and has four terminal contact sections formed near a corner thereof. The terminal contact section is formed, for example, by drawing the metal plate 23b. The negative electrode terminal section of the battery cell 16c is exposed from the opening of the end portion of the battery cell receiving section 19c. The negative electrode terminal section of the battery cell 16d is exposed from the opening of the end portion of the battery cell receiving section 19d. The positive electrode terminal section of the battery cell 16e is exposed from the opening of the end portion of the battery cell receiving section 19e. The positive electrode terminal section of the battery cell 16f is exposed from the opening of the end portion of the battery cell receiving section 19f.

The terminal contact section formed near the upper right corner (in the drawings) of the metal plate 23b is joined to the negative electrode terminal section of the battery cell 16c. The lower terminal contact section thereof is joined to the negative electrode terminal section of the battery cell 16d. The terminal contact section formed near the upper left corner of the metal plate 23b is joined to the positive electrode terminal section of the battery cell 16e. The lower terminal contact section thereof is joined to the positive electrode terminal section of the battery cell 16f.

The metal plate 23c has, for example, a substantially rectangular shape and has two terminal contact sections formed in the vertical direction. The terminal contact section is formed, for example, by drawing the metal plate 23c. The negative electrode terminal section of the battery cell 16g is exposed from the opening of the end portion of the battery cell receiving section 19g. The negative electrode terminal section of the battery cell 16h is exposed from the opening of the end portion of the battery cell receiving section 19h. Thus, the upper terminal contact section of the metal plate 23c is joined to the negative electrode terminal section of the battery cell 16g. The lower terminal contact section of the metal plate 23c is joined to the negative electrode terminal section of the battery cell 16h.

The metal plate 23d has, for example, a substantially rectangular shape and has four terminal contact sections formed near the corner thereof. In substantially the center of the metal plate 23d, a through hole 26a penetrated by the screw 20a is formed. The terminal contact section is formed, for example, by drawing the metal plate 23d. The negative electrode terminal section of the battery cell 16a is exposed from the opening of the end portion of the battery cell receiving section 19i. The negative electrode terminal section of the battery cell 16b is exposed from the opening of the end portion of the battery cell receiving section 19j. The positive electrode terminal section of the battery cell 16c is exposed from the opening of the end portion of the battery cell receiving section 19k. The positive electrode terminal section of the battery cell 16d is exposed from the opening of the end portion of the battery cell receiving section 19l.

The terminal contact section formed near the upper right corner of the metal plate 23d is joined to the negative electrode terminal section of the battery cell 16a. The lower terminal contact section thereof is joined to the negative electrode terminal section of the battery cell 16b. The terminal contact section formed near the upper left corner of the metal plate 23d is joined to the positive electrode terminal section of the battery cell 16c. The lower terminal contact section thereof is joined to the positive electrode terminal section of the battery cell 16d.

The metal plate 23e has, for example, a substantially rectangular shape and has four terminal contact sections formed near the corner thereof. In substantially the center of the metal plate 23e, a through hole 26b penetrated by the screw 20b is formed. The terminal contact section is formed, for example, by drawing the metal plate 23e. The negative electrode terminal section of the battery cell 16e is exposed from the opening of the end portion of the battery cell receiving section 19m. The negative electrode terminal section of the battery cell 16f is exposed from the opening of the end portion of the battery cell receiving section 19n. The positive electrode terminal section of the battery cell 16g is exposed from the opening of the end portion of the battery cell receiving section 19o. The positive electrode terminal section of the battery cell 16h is exposed from the opening of the end portion of the battery cell receiving section 19p.

The terminal contact section formed near the upper right corner of the metal plate 23e is joined to the negative electrode terminal section of the battery cell 16e. The lower terminal contact section thereof is joined to the negative electrode terminal section of the battery cell 16f. The terminal contact section formed near the upper left corner of the metal plate 23d is joined to the positive electrode terminal section of the battery cell 16g. The lower terminal contact section thereof is joined to the positive electrode terminal section of the battery cell 16h.

The metal plate 23a, the metal plate 23b, . . . , and the metal plate 23e (hereinafter, when there is no need to distinguish them, the metal plate is referred to as the metal plate 23) are preferably formed of a copper alloy or a material similar thereto. Thus, it is possible to supply electricity by low resistance. The metal plate 23 is, for example, formed of nickel or a nickel alloy. Accordingly, weldability between the terminal contact section formed in the metal plate 23 and the positive electrode terminal section or the negative electrode terminal section is good. The surface of the metal plate 23 may be plated with tin or nickel. Accordingly, it is possible to prevent the surface of the metal plate 23 from being oxidized, and rust from being generated.

The respective battery cells 16 are electrically connected to each other by the metal plate 23. Two battery cells 16 are connected to each other in parallel by the connection shown in FIG. 1, and four of the pairs of battery cells 16 connected to each other in parallel are connected to each other in series. A predetermined wiring pattern is formed in a flexible substrate 24. The metal plate 23 is connected to a predetermined location of the wiring pattern of the flexible substrate 24. For example, a predetermined location of the metal plate 23 is soldered to a predetermined location of the flexible substrate 24.

Battery Holder

Next, the battery holder will be described. The battery holder 18a and the battery holder 18b have substantially the same shape. Hereinafter, the battery holder 18a will be described.

Figure 2:
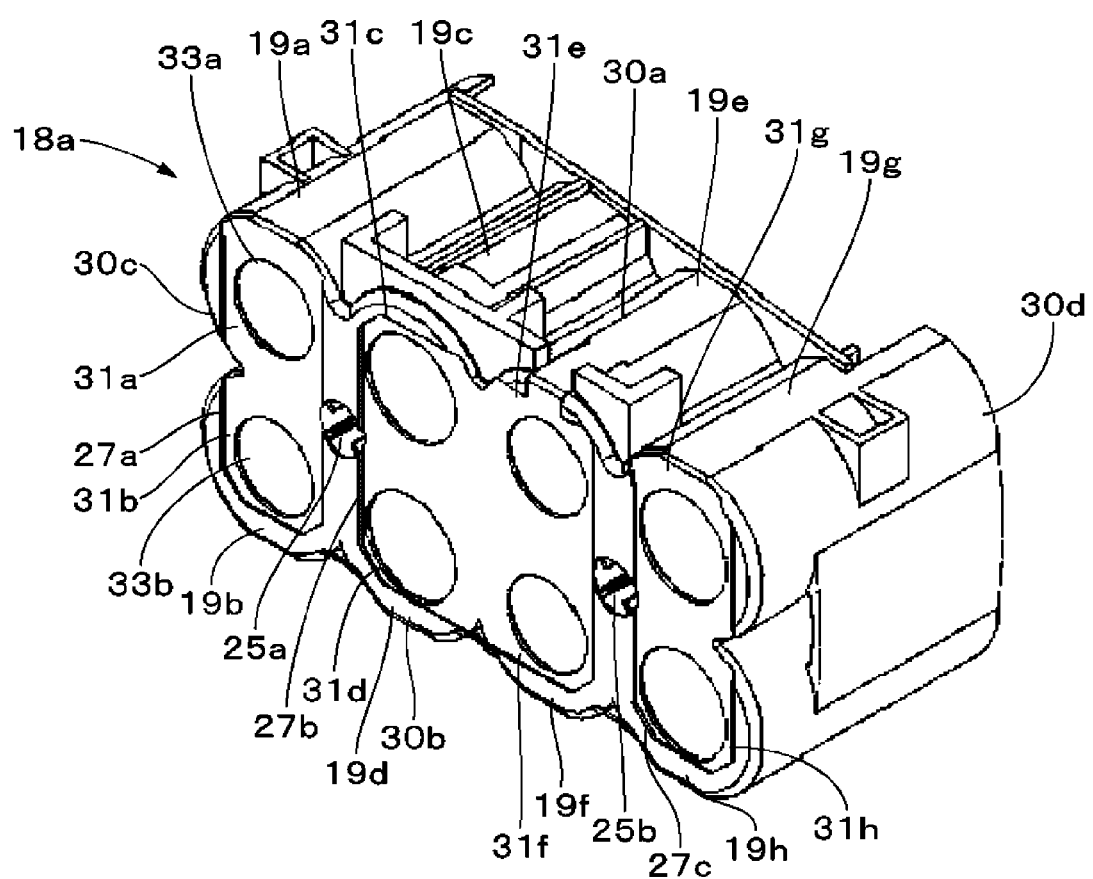
FIG. 2 is a perspective view showing an example of a configuration of a battery holder.

FIG. 2 is a perspective view of the battery holder 18a. In the battery holder 18a, an upper surface section 30a, a bottom surface section 30b, a side surface section 30c, and a side surface section 30d are continuously formed. In the battery holder 18a, for example, eight battery cell receiving sections 19 (a battery cell receiving section 19a to a cell receiving section 19h) are formed at predetermined intervals. The battery cell receiving section 19 is formed, for example, in a cylindrical shape, and the battery cell 16 can be inserted into each battery cell receiving section 19. A local point, which has a curved shape and a draft angle of 0, may be provided on the peripheral surface of the battery cell receiving section 19. Thus, the battery cell 16 can be inserted into the battery cell receiving section 19 by reducing the clearance.

One end side of the battery cell receiving section 19 is opened such that the battery cell 16 can be inserted thereinto. A substantially circular end section is formed on the other end side of the battery cell receiving section 19. In the end section of the battery cell receiving section 19a, an outer surface 31a and an inner surface 32a are formed. In the end section of the battery cell receiving section 19b, an outer surface 31b and an inner surface 32b are formed. In the end section of the battery cell receiving section 19c, an outer surface 31c and an inner surface 32c are formed. In the end section of the battery cell receiving section 19d, an outer surface 31d and an inner surface 32d are formed.

In the end section of the battery cell receiving section 19e, an outer surface 31e and an inner surface 32e are formed. In the end section of the battery cell receiving section 19f, an outer surface 31f and an inner surface 32f are formed. In the end section of the battery cell receiving section 19g, an outer surface 31g and an inner surface 32g are formed. In the end section of the battery cell receiving section 19h, an outer surface 31h and an inner surface 32h are formed. The same plane is formed by the respective outer surfaces. In addition, when there is no need to distinguish the respective end surfaces, suitably, they are referred to as an outer surface 31 or an inner surface 32. The inner surface 32 is a surface of a hollow side of the battery cell receiving section 19 and a surface of the other side thereof is the outer surface 31.

In the end section of the battery cell receiving section 19, for example, a substantially circular opening is formed. For example, an opening 33a is formed in the end section of the battery cell receiving section 19a. An opening 33b is formed in the end section of the battery cell receiving section 19b. Similarly, an opening is also formed in the end section of another battery cell receiving section 19. When there is no need to distinguish the respective openings, they are referred to as an opening 33. In addition, in FIG. 2, in order to simplify the illustration, only the opening 33a and the opening 33b are denoted by the reference numerals. The positive electrode terminal section or the negative electrode terminal section of the battery cell 16 is exposed in the opening 33. In addition, a part of the rubber ring 21 is exposed around a portion of the opening 33 from which the positive electrode terminal section is exposed.

In addition, the outer surface 31 may be provided with a concave section for positioning the metal plate 23. For example, the outer surface 31a and the outer surface 31b are provided with concave sections 27a corresponding to the shape of the metal plate 23a. The outer surface 31c, the outer surface 31d, the outer surface 31e and the outer surface 31f are provided with concave sections 27b corresponding to the shape of the metal plate 23b. The outer surface 31g and the outer surface 31h are provided with concave sections 27c corresponding to the shape of the metal plate 23c.

The battery cell receiving section 19 has, for example, a curved peripheral surface. A part of the peripheral surface of the battery cell receiving section 19a, the peripheral surface of the battery cell receiving section 19c, the peripheral surface of the battery cell receiving section 19e, and a part of the peripheral surface of the battery cell receiving section 19g constitute the upper surface section 30a. A part of the peripheral surface of the battery cell receiving section 19b, the peripheral surface of the battery cell receiving section 19d, the peripheral surface of the battery cell receiving section 19f, and a part of the peripheral surface of the battery cell receiving section 19h constitute the bottom surface section 30b. A part of the peripheral surface of the battery cell receiving section 19a and a part of the peripheral surface of the battery cell receiving section 19b constitute the side surface section 30c. A part of the peripheral surface of the battery cell receiving section 19g and a part of the peripheral surface of the battery cell receiving section 19h constitute the side surface section 30d.

A hole section 25a and a hole section 25b are formed in the battery holder 18a. The screws are inserted into the hole section 25a and the hole section 25b and are rotated, and thus the battery holder 18a and the battery holder 18b are fixed.

Shape of Battery Block

Figure 3:
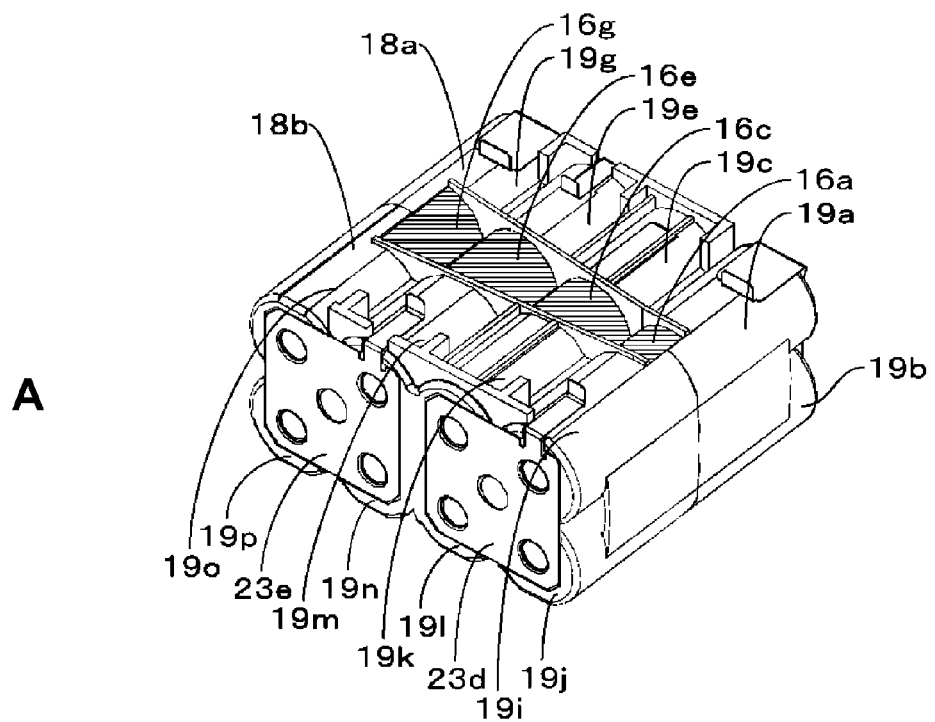
FIGS. 3A and 3B are perspective views showing an example of a configuration of a battery block.
Figure 3:
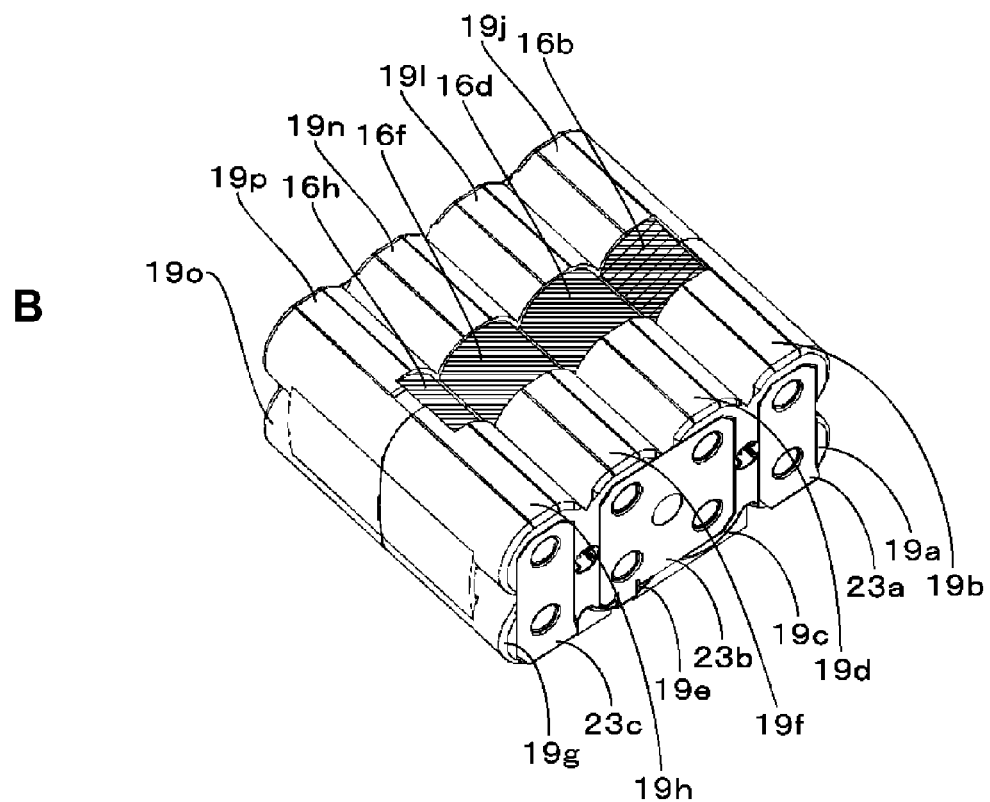

FIG. 3A is a perspective view showing an example of an exterior of the battery block, and FIG. 3B is a perspective view showing an example of the exterior of the battery block vertically reversed. The battery cells 16 are inserted into the respective battery cell receiving sections 19 of the battery holder 18a and the battery holder 18b. The battery holder 18a and the battery holder 18b are fastened and fixed, for example, by the screw to form the battery block.

The vicinity of the center of the battery cell 16 in the battery block is exposed to the outside without being inserted into the battery cell receiving section 19. A part of the battery cell 16 is exposed to the outside, and thus a heat dissipation property of the battery cell 16 can be satisfactory. Although the battery cell 16 is more likely to be flooded by the exposure of a part of the battery cell 16, in the present disclosure, the flooding to the battery cell 16 can be prevented as will be described below. For this reason, it is possible to prevent the flooding to the vicinity of the positive electrode terminal section of the battery cell 16 while securing a heat dissipation property of the battery cell 16.

Shape of Metal Plate

Figure 4:
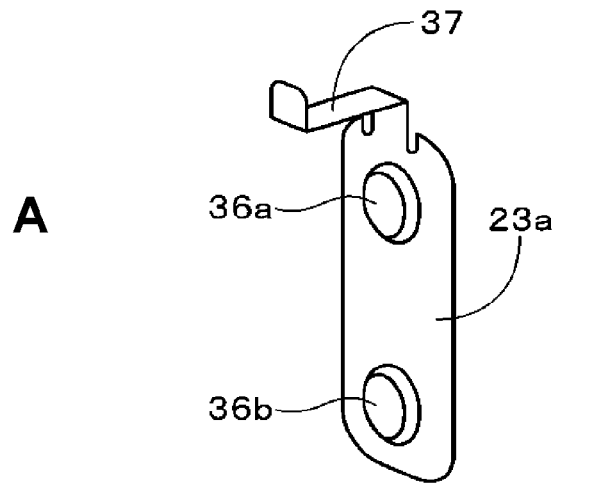
FIGS. 4A and 4B are perspective views showing an example of a configuration of a metal plate.
Figure 4:
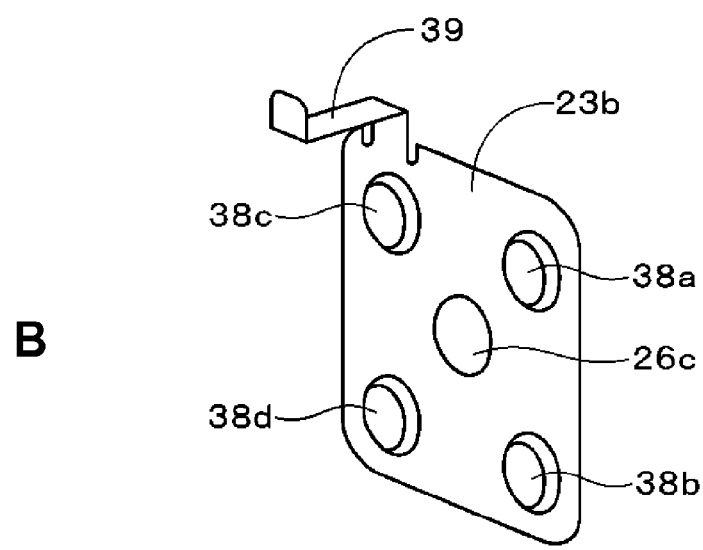

FIG. 4A shows an example of the exterior of the metal plate 23a. The metal plate 23a has, for example, a flat plate shape, and has a terminal contact section 36a and a terminal contact section 36b formed in the vertical direction. The number of the terminal contact sections formed on the metal plate 23a can be suitably changed. The terminal contact section 36a and the terminal contact section 36b have a throttle shape formed by drawing the metal plate 23a. By the throttle shape, it is possible to facilitate the joining of the terminal contact section to the positive electrode terminal section of the battery cell 16. The metal plate extending from the vicinity of the end section of the metal plate 23a is bent to form a curved section 37. For example, the tip of the curved section 37 is joined to a flexible substrate 24. In addition, the metal plate 23c has substantially the same configuration as the metal plate 23a.

FIG. 4B shows an example of the exterior of the metal plate 23b. The metal plate 23b has, for example, a flat plate surface, and is formed with four terminal contact sections. The number of the terminal contact sections formed in the metal plate 23b can be suitably changed. A terminal contact section 38a is formed near the right upper corner in the drawing. A terminal contact section 38b is formed below the terminal contact section 38a. A terminal contact section 38c is formed near the left upper corner thereof. A terminal contact section 38d is formed below the terminal contact section 38c. A through hole 26c through which a screw or the like penetrates is formed substantially in a center of the metal plate 23b. In addition, the metal plate 23d and the metal plate 23e have substantially the same configuration as the metal plate 23b.

The terminal contact section 38a, the terminal contact section 38b, the terminal contact section 38c, and the terminal contact section 38d have a throttle shape formed by drawing the metal plate 23b. By the throttle shape, it is possible to facilitate the joining of the terminal contact section to the positive electrode terminal section or the negative terminal section of the battery cell 16. The metal plate extending from the vicinity of the end section of the metal plate 23b is bent to form a curved section 39. For example, the tip of the curved section 39 is joined to a flexible substrate 24.

Shape of Rubber Ring

Figure 5:
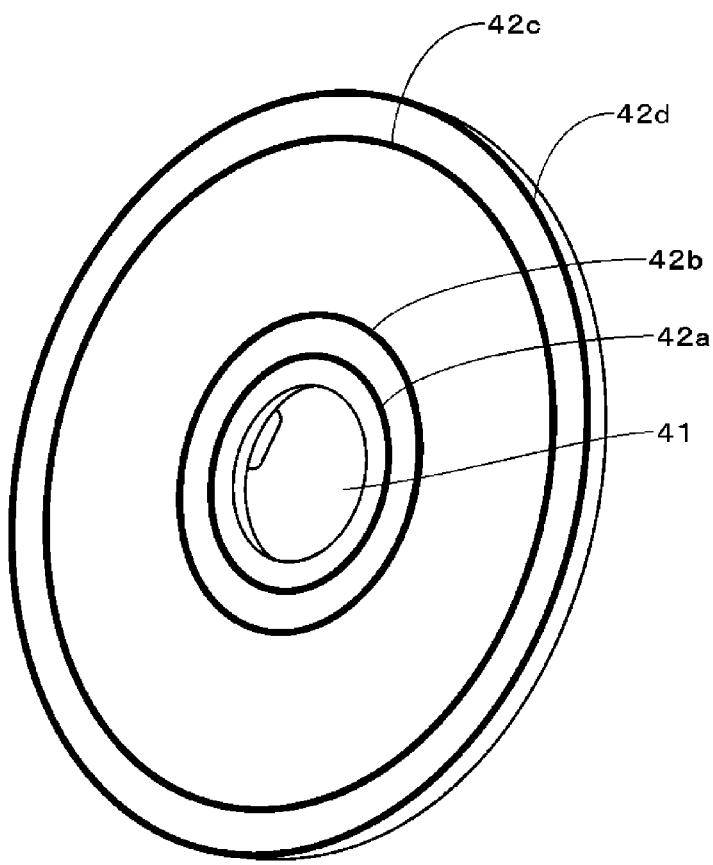
FIG. 5 is a perspective view showing an example of a configuration of a rubber ring.

FIG. 5 is an enlarged perspective view showing an example of the shape of the rubber ring 21. Herein, although the rubber ring 21a is described as an example, other rubber rings have the same shape. The diameter of the rubber ring 21a is slightly smaller than that of the hollow of the battery cell receiving section 19a. Accordingly, the rubber ring 21a can be inserted into the battery cell receiving section 19a. The rubber ring 12a is formed with a substantially circular hole section 41 substantially in a center thereof.

One or more protrusion sections are formed on one surface of the rubber ring 21a. For example, in the rubber ring 21a, a protrusion section 42a and a protrusion section 42b are formed adjacent to each other near the hole section 41. A protrusion section 42c is formed near the peripheral section of the rubber ring 21a. A protrusion section 42d adjacent to the protrusion section 42c is formed on the outer peripheral section of the rubber ring 21a. In FIG. 5, the respective protrusion sections are indicated by a thick line. The protrusion section 42a, the protrusion section 42b, the protrusion section 42c, and the protrusion section 42d (herein, when there is no need to distinguish them, the protrusion sections are referred to as the protrusion section 42) are, for example, in a concentrically circular shape. The respective protrusion sections may have the same shape or different shapes. For example, the heights and the widths of the protrusion sections may be different from each other. The number of the protrusion sections or the like can be suitably changed.

Figure 6:
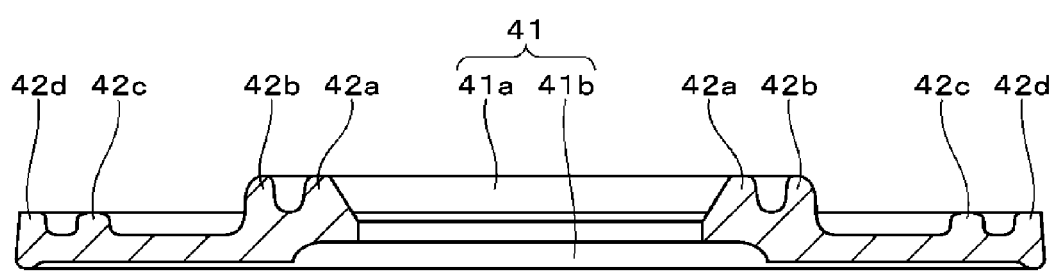
FIG. 6 is a schematic diagram showing an example of a cross-section of the rubber ring.

FIG. 6 shows an example of the cross-section of the rubber ring 21a. The rubber ring 21a is formed with the protrusion section 42a, the protrusion section 42b, and the protrusion section 42c, and the protrusion section 42d is formed on the outer peripheral section of the rubber ring 21a. In the example shown in FIG. 6, the heights of the protrusion section 42a and the protrusion section 42b are set to be higher than those of the protrusion section 42c and the protrusion section 42d.

The hole section 41 includes, for example, a hole section 41a, and a hole section 41b communicating with the hole section 41a and having a substantially circular form. The shape of the hole section 41a has an opening that has substantially the same diameter as the terminal contact section. An edge of the hole section 41a is formed with a slope surface corresponding to the throttle shape of the terminal contact section. The hole section 41b has an opening that has substantially the same diameter as the positive electrode terminal section of the battery cell 16. The peripheral portion of the hole section 41b is placed below the protrusion section 42a. When the positive electrode terminal section is inserted into the hole section 41b, the peripheral portion of the positive electrode terminal section is placed on one surface side (the lower side) of the protrusion section 42a, and the portion near the center of the positive electrode terminal section is exposed from the hole section 41b. In a portion in which the terminal contact section is inserted from the opening of the hole section 41a and the hole section 41a communicates with the hole section 41b, the terminal contact section is joined to the exposed portion of the positive electrode terminal section.

Configuration of Battery Cell

Figure 7:
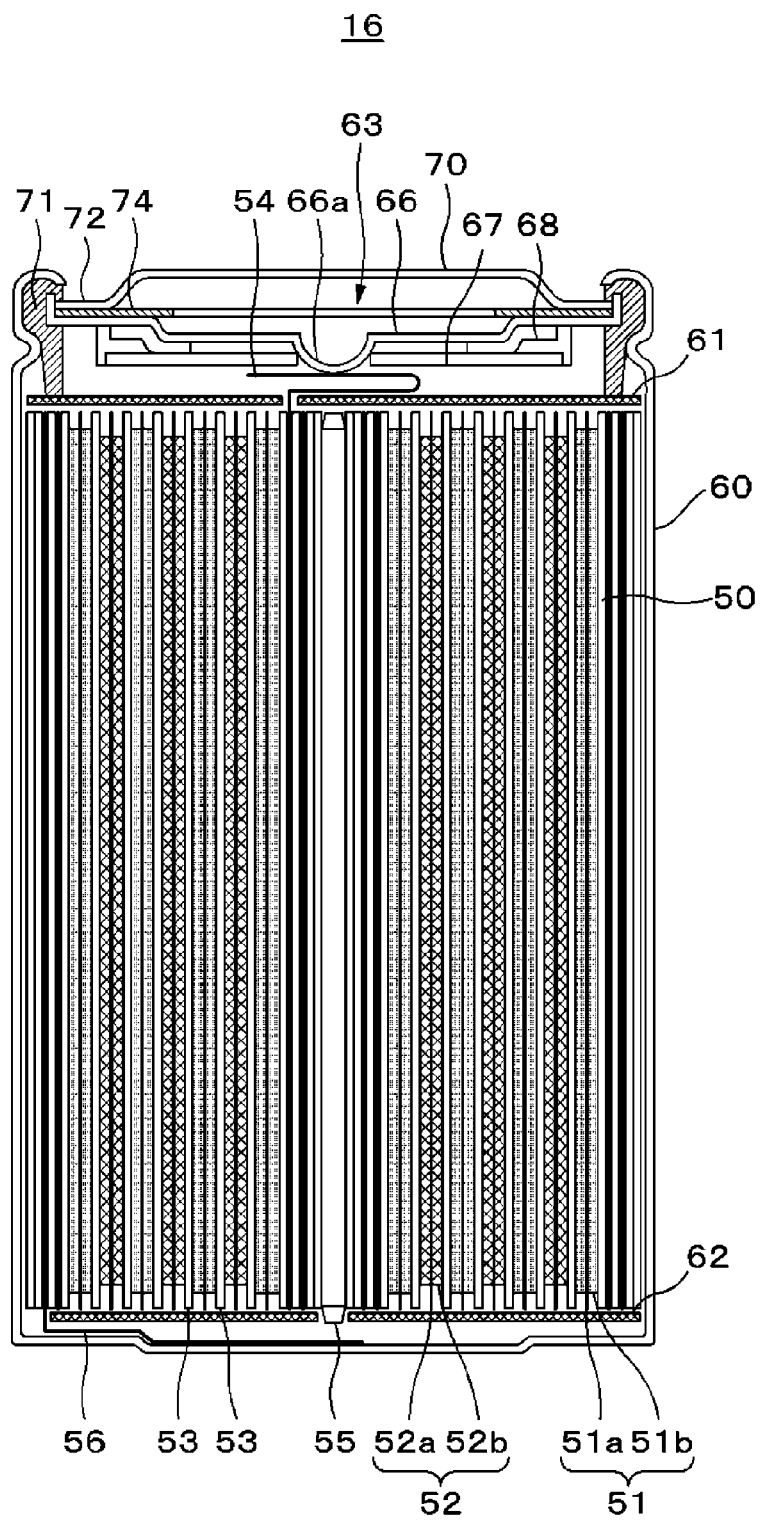
FIG. 7 is a schematic diagram showing an example of an internal configuration of a battery cell.

An example of the battery cell will be described. The battery cell 16 is, for example, a cylindrical lithium ion secondary battery. An example of the lithium ion secondary battery will be described with reference to FIG. 7. A power generation element 50 is received inside a cylindrical battery container (also referred to as a battery can).

The power generation element 50 is configured so that a band-like positive electrode 51 and negative electrode 52 are wrapped around a center pin 55 via a separator 53, and an electrolytic solution which is a liquid electrolyte is impregnated in the separator 53. The positive electrode 51 has, for example, a structure in which a positive electrode mixture layer 51b including a positive electrode material capable of being doped and de-doped with lithium (Li) as a positive electrode active material is provided on both surfaces (or one surface) of a positive electrode collector 51a formed of aluminum foil or the like. A positive electrode lead 54 formed of aluminum or the like is attached to the positive electrode collector 51a and is derived outside the power generation element 50.

The negative electrode 52 has, for example, a structure in which a negative electrode mixture layer 52b including a negative electrode material capable of being doped and de-doped with lithium as a negative electrode active material is provided on both surfaces (or one surface) of a negative electrode collector 52a formed of a copper foil. A negative electrode lead 56 formed of copper is attached to the negative electrode collector 52a and is derived outside the power generation element 50.

The separator 53 is constituted by, for example, a porous membrane made of a synthetic resin or ceramic. The electrolytic solution includes, for example, a solvent such as an organic solvent, and lithium salt, which is an electrolyte salt, dissolved in the solvent. A pair of insulating plates 61 and 62 are placed on the winding peripheral surface of the power generation element 50.

The battery container 60 is, for example, formed of nickel (Ni)-plated iron (Fe) or stainless steel, one end surface (negative electrode) side thereof is blocked and the other end surface (positive electrode) side thereof is opened. The battery container 60 is connected to the negative electrode and functions as the negative electrode terminal. Furthermore, a safety mechanism 63 and a top cover (also referred to as a battery lid) 70 are attached to the open end surface section of the battery container 60 by being caulked via a gasket, and thus the inside of the battery container 60 is sealed.

An example of the safety mechanism 63 will be described. A safety valve 66 formed of a metal material formed of aluminum or the like and a support holder 67 formed of a metal material such as aluminum is fitted via an insulating holder 68. The safety valve 66 has a projection section 66a projected to the power generation element 50 in the center of the bottom section, and the projection section 66a is inserted into the opening formed in the center of the bottom section of the support holder 67. A flange section for securing the electrical connection with the top cover 70 via a PTC element is provided on the outer periphery of the safety valve 66, and the support holder 67 is formed with openings as a plurality of vent holes in a sidewall thereof. The positive electrode lead 54 is welded to the projection section 66a of the safety valve 66.

In the safety mechanism 63, when internal pressure of the battery rises and reaches a predetermined value due to an internal short circuit, the heating of the outside or the like, the increased internal pressure is transmitted to the safety valve 66 through the opening of the support holder 67. The safety valve 66 is deformed to the top cover 70 side due to the internal pressure. As a result, the battery internal pressure is relaxed, the electrical connection between the safety belt 66 and the positive electrode lead 54 is cut off, and thus the electrical connection between the top cover 70 and the power generation element 40 is cut off.

The top cover 70 is a positive electrode terminal section serving as the positive electrode terminal of the battery. The top cover 70 is, for example, formed of stainless steel doped with nickel as in the battery container 60. The top cover 70 has a flange section 72 on the periphery thereof and has a plurality of notches in the upper section thereof. The flange section 72 of the top cover 70 is electrically connected to the flange section of the safety valve 66 via a PTC element 74. When temperature rises, the resistance value of the PTC element 74 is increased to prevent abnormal heat generation due to a large current.

The secondary battery mentioned above is manufactured, for example, as below.

Firstly, a positive electrode material capable of being doped and de-doped with lithium, a conductive agent, and a binding agent are mixed to prepare a positive electrode mixture, and the positive electrode mixture is dispersed in a mixed solvent to form a positive electrode mixture slurry. Next, after the positive electrode mixture slurry is applied to the positive electrode collector 51a and is dried, the positive electrode mixture slurry undergoes compression molding to form the positive electrode mixture layer 51b, thereby manufacturing the positive electrode 51. Thereafter, the positive electrode lead 54 is connected to the positive electrode collector 51a using ultrasonic welding, spot welding or the like.

Furthermore, the negative electrode material capable of being doped and de-doped lithium is mixed with a binding agent to prepare a negative electrode mixture, and the negative electrode mixture is dispersed in a mixed solvent to form a negative electrode mixture slurry. Next, after the negative electrode mixture slurry is applied to the negative electrode collector 52a and is dried, the negative electrode mixture slurry undergoes compression molding to form the negative electrode mixture layer 52b, thereby manufacturing the negative electrode 52. Thereafter, the negative electrode lead 56 is connected to the negative electrode collector 51a using ultrasonic welding, spot welding or the like.

Moreover, the positive electrode 51 and the negative electrode 52 are wound via the separator 53 several times to manufacture a winding electrode body. Thereafter, the winding electrode body is interposed between the pair of insulating plates 61 and 62 and is received in the battery container 60, the positive electrode lead 54 is welded to the safety valve 66 of the safety mechanism 63, and the negative electrode lead 56 is welded to the battery container 60.

Furthermore, an electrolyte salt is dissolved in the solvent to prepare the electrolytic solution. Thereafter, the electrolytic solution is injected into the battery container 60 and is impregnated in the separator 53. Next, the safety mechanism 63 and the top cover 70 are fixed to the opened section of the battery container 60 by being caulked via the gasket 71. In addition, although it is not shown, a ring washer made of a resin is attached to the top cover 70, and the entire periphery of the battery is covered by a resin tube. The resin tube is, for example, a thermal shrinkable tube that shrinks with heat.

Figure 8:
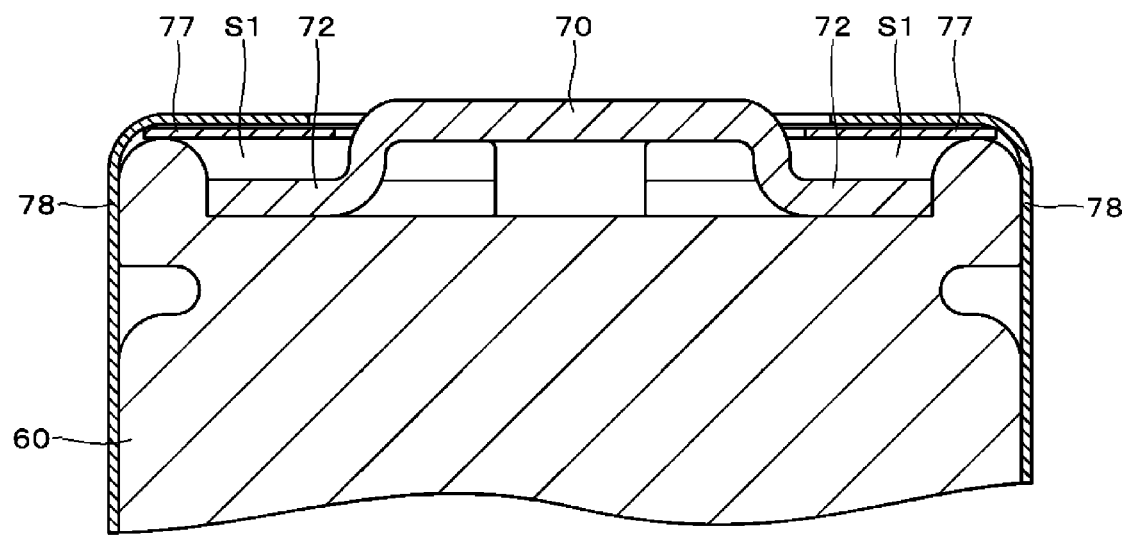
FIG. 8 is an enlarged view showing an example of the vicinity of a positive electrode terminal section of the battery cell.

FIG. 8 is an enlarged view showing the vicinity of the positive electrode terminal section of the battery cell 16. In addition, in FIG. 8, in order to simplify the description, the battery cell 16 is partially simplified. A ring washer 77 is attached to the top cover 70. Moreover, the periphery of the battery container 60 is covered by a resin tube 78. An end surface is formed around the top cover 50 by the ring washer 77 and the resin tube 78.

Herein, for example, when the vicinity of the flange section 7 of the battery cell 16 is flooded, it affects the performance of the battery cell 16. Thus, moisture or the like should be prevented from flooding into a space S1 around the flange section 72. In addition, in the vicinity of the space S1, a portion in which the battery container 60 or the like is caulked is called a crimp section. One path through which moisture enters the space S1 is a path through which it floods in via a slight gap formed between the top cover 70 and the ring washer 77. Another is a path through which moisture attached to the vicinity of the negative electrode terminal section flows through a slight gap between the resin tube 78 and the battery container 60 by a capillary phenomenon and the flowing moisture floods in from the vicinity of the crimp section. Thus, the flooding should be prevented along such paths.

Figure 9:
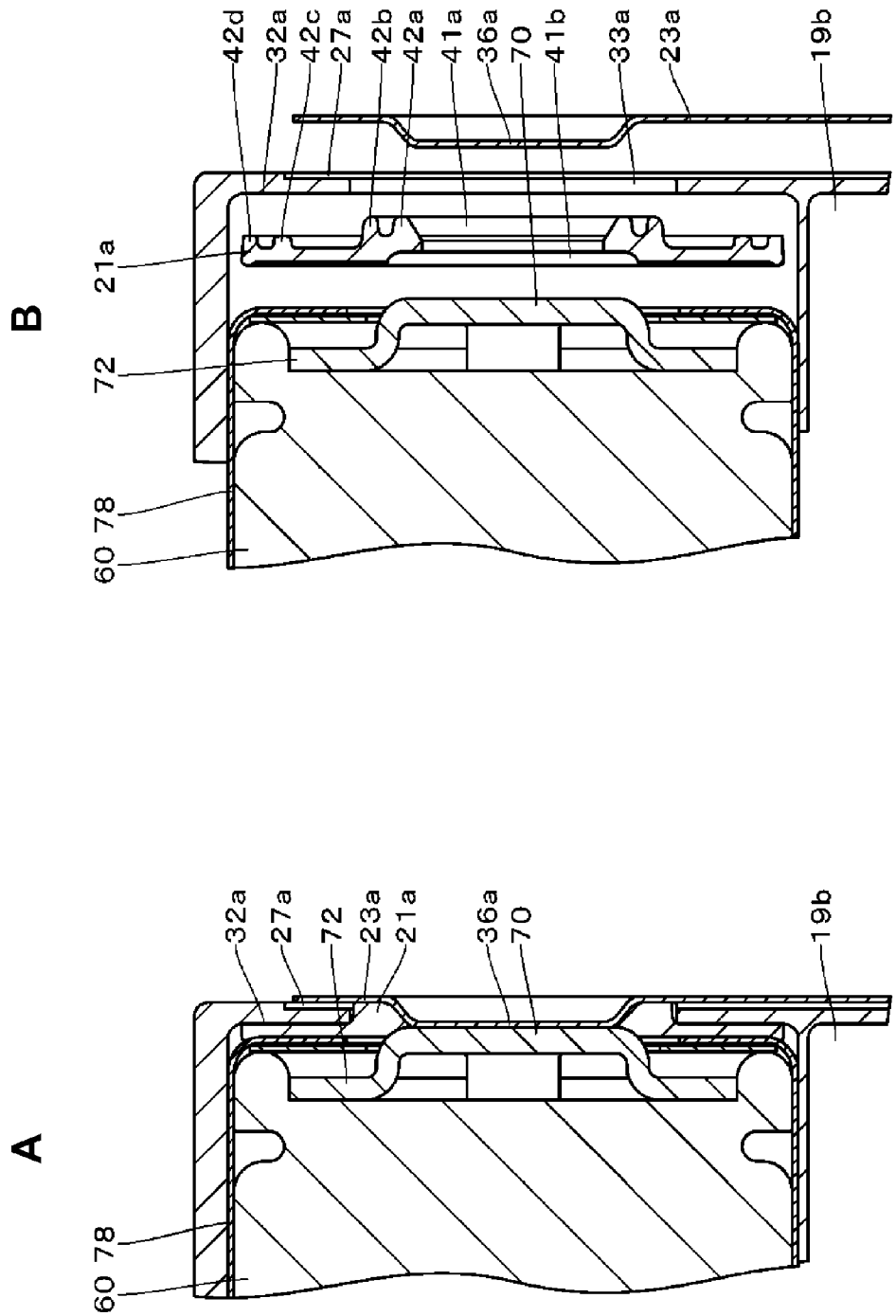
FIGS. 9A and 9B are schematic diagrams for describing an example of a process of assembling the rubber ring.

Thus, in the present disclosure, the flooding along such paths is prevented using the rubber ring 21. As shown in FIG. 9A, the rubber ring 21a is inserted into the battery cell receiving section 19a. The rubber ring 21a is inserted so that a surface thereof formed with the protrusion section 42 faces the inner surface 32a of the battery cell receiving section 19a. The positive electrode terminal section side of the battery cell 16a is inserted into the battery cell receiving section 19a. The negative electrode terminal side of the battery cell 16a is inserted into the battery cell receiving section 19*i* of the battery holder 18*b*. The battery holder 18*a* and the battery holder 18*b* are fixed, and thus the battery cell 16*a* is fixed to the battery cell receiving section 19*a* and crushes the rubber ring 21*a*. That is, the peripheral portion (for example, near the portion in which the protrusion section 42*c*, the protrusion section 42*d* or the like is formed) of the rubber ring 21*a* is crushed by being interposed between the end surface near the periphery of the top cover 70 and the inner surface 32*a*.

The top cover 70 is inserted into the hole section 41*b* of the rubber ring 21*a* and a substantial vicinity of the center of the top cover 70 is exposed from the hole section 41*a*. In addition, the peripheral portion (for example, the portion near the protrusion section 42*a* and the protrusion section 42*b*) of the hole section 41*a* of the rubber ring 21*a* is exposed from the opening 33*a*. The terminal contact section 36*a* is inserted from the opening 33*a*. Moreover, the terminal contact section 36*a* is joined to the exposed portion of the top cover 70. The portion of the rubber ring 21*a* exposed from the opening 33*a* is interposed and crushed by the peripheral portion of the top cover 70 and the metal plate 23*a* around the terminal contact section 36*a*.

An example of a state in which the terminal contact section 36*a* is joined to the top cover 70 is shown in FIG. 9B. The gap near the periphery of the top cover 70 is sealed by the rubber ring 21*a*. Accordingly, it is possible to prevent the flooding from the gap around the top cover 70. In addition, the rubber ring 21*a* is constricted by the end surface around the top cover 70 and the inner surface 32*a*. Accordingly, the gap between the battery container 60 near the crimp section and the resin tube 78 is pressed and sealed. The flow path of moisture transmitted through the gap between the battery container 60 and the resin tube 78 is blocked and thus the flooding from the vicinity of the crimp section can be prevented.

In addition, not only waterproofing properties, but also shock resistance can be improved. The rubber ring 21*a* has elasticity. For this reason, even when shock is applied, such as when the battery pack 1 is dropped, the rubber ring 21*a* functions as a shock absorbing material and can mitigate the external shock. Since there is no need to insert a shock absorbing material or the like into the battery pack 1, reduction of the cost can be promoted.

In addition, although an example of the assembly process in the battery cell receiving section 19*a* has been described in FIGS. 9A and 9B, other battery cell receiving sections 19 are similarly assembled. As mentioned above, waterproofing properties of the battery cell can be improved. The portion of the battery cell receiving section 19 in the battery holder 18*b* to which the positive electrode terminal section of the battery cell 16 is inserted can also be similarly assembled.

The case in which a waterproofing sheet having waterproofing properties is adhered to the battery cell can also be considered. However, a method of using the waterproofing sheet has the following problems. There is a problem that the positioning of the waterproofing sheet to the battery cell is not easy. There is a problem that external shock occurs, such as when the battery pack is dropped, and the waterproofing sheet is peeled off. There is a problem that adhesion strength of the waterproofing sheet is changed due to passage of time and an external environment, and waterproofing performance is lowered. In order to prevent the flooding from the negative electrode terminal section side, a waterproofing sheet should be adhered near the negative electrode terminal section.

However, in the present disclosure, for example, by using the rubber ring, the rubber ring may be inserted into the battery cell receiving section and may be crushed, and the rubber ring is easily positioned. The rubber ring is not prone to change due to passage of time. Since the rubber ring is constricted so as to be crushed, the position of the rubber ring does not deviate due to shock from the outside. For this reason, it is possible to prevent a decline in waterproofing performance due to the deviation of the position of the rubber ring. In addition, the rubber ring may be placed only on the positive electrode terminal section side, and thus the cost can be reduced.

In addition, as mentioned above, the protrusion section 42 is formed on one surface of the rubber ring 21. Although the protrusion section 42 need not necessarily be formed, it is preferred for the protrusion section 42 to be formed in view of effects to be mentioned below.

For example, by forming the protrusion section 42*c* and the protrusion section 42*d*, the contact area to the inner surface 32*a* can be reduced. Because the contact area is reduced, pressure is increased. Accordingly, even when pressure applied from the outside is small, the rubber ring 21*a* can be effectively crushed. In addition, a creeping distance can be lengthened by a plurality of protrusions 42. Herein, the creeping distance is a distance by which moisture flooding in from the vicinity of the opening 33*a* flows.

For example, after welding the metal plate 23*a*, moisture may enter near the concave section 27*a* formed in the battery holder 18*a*. The entering moisture is transmitted through the surface of the rubber ring 21*a*, reaches the crimp section, and may be flooded. However, the creeping distance of moisture can be lengthened by providing the protrusion sections 42, and thus it is possible to prevent the entering moisture from reaching the vicinity of the crimp section.

The thickness of the protrusion section 42*a* may be different from that of the protrusion section 42*b*. Since the peripheral portion of the hole section 41*b* is placed in the end section of the protrusion section 42*a*, the thickness of the protrusion section 42*a* is smaller than that of the protrusion section 42*b*. For this reason, the protrusion 42*a* is easily deformed by being crushed. In the portion formed with the protrusion 42*a*, cohesion with the metal plate 23*a* becomes important. For this reason, the thickness of the protrusion section 42*a* is thinned so as to be easily deformed. On the other hand, for example, the protrusion section 42*b* is formed so as to position a location of the rubber ring 21*a* to the battery cell receiving section 19*a*. The protrusion section 42*b* is thickened to secure rigidity so that a function as the positioning protrusion section is obtained.

By forming the protrusion section 42*a* and the protrusion section 42*b* close to each other, a slight space is formed between the protrusions section 42*a* and the protrusions section 42*b*. The space is used as an escape when the protrusion section 42*a* and the protrusion section 42*b* are deformed, and thus the protrusion section 42*a* and the protrusion section 42*b* are easily deformed. For this reason, the rubber ring 21*a* can be crushed by small pressure.

In the state in which the metal plate 23*a* is pressed against the protrusion section 42*a* and the protrusion section 42*b* by predetermined pressure, the top cover 70 and the terminal contact section 36*a* are, for example, subjected to the resistance welding. When great pressure is necessary to crush the protrusion section 42*a* and the protrusion section 42*b*, the tip cover 70 and the terminal contact section 36*a* are separated from each other by repulsive force of the rubber ring 21*a*, which may cause the joining defect. However, by providing the space of the escape of the protrusion section 42*a* and the protrusion section 42*b*, the protrusion section 42*a* and the protrusion section 42*b* can be crushed by small pressure, and thus an occurrence of a joining defect can be prevented.

Figure 10:
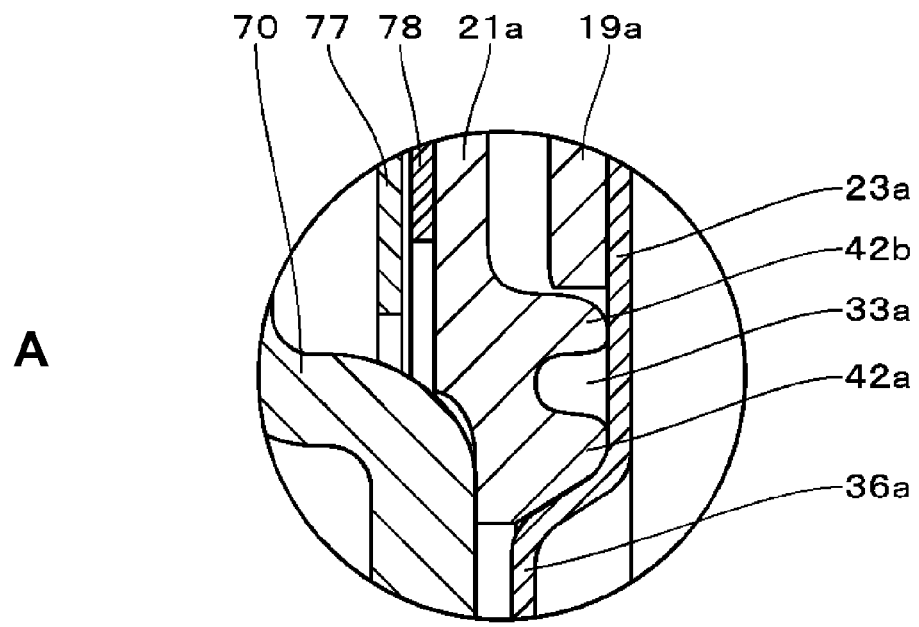
FIGS. 10A and 10B are partially enlarged views for describing a deformed state of the rubber ring.
Figure 10:
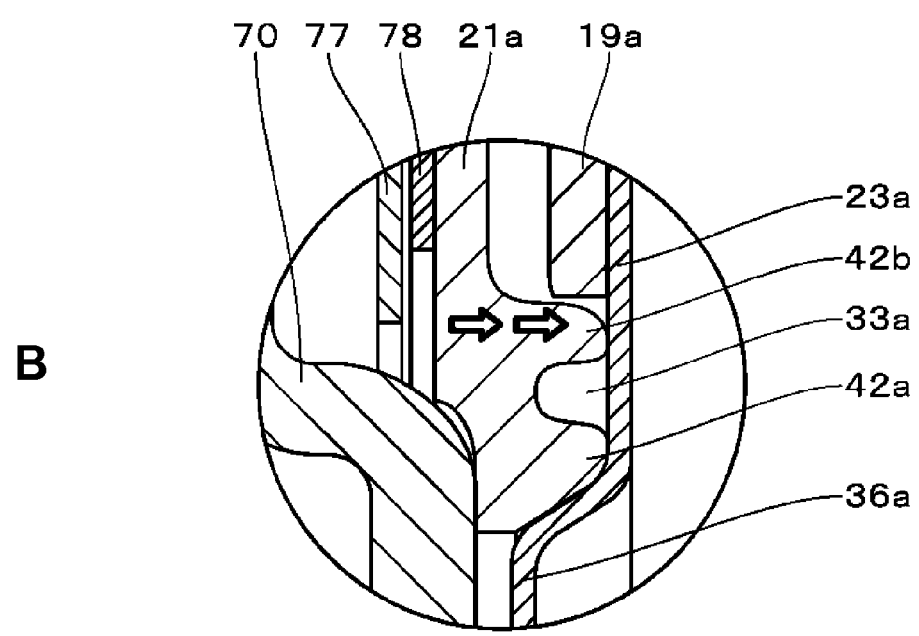

In addition, as schematically shown in a partially enlarged diagram of FIG. 10A, a gap between the side surface of the protrusion section 42b and the peripheral surface of the opening 33a may be small. The side surface of the protrusion section 42b may come into contact with the peripheral surface of the opening 33a. For example, when the battery cell 16a is inserted into the battery cell receiving section 19a, the rubber ring 21a is pushed out by the peripheral section of the top cover 70.

At this time, as schematically shown in a partially enlarged diagram of FIG. 10B, while the side surface of the protrusion 42b is restricted by the peripheral surface of the opening 33a, the rubber ring 21a is pushed out. Thus, it is possible to prevent the rubber ring 21a from being unnecessarily deformed. In addition, the correction of the positioning is performed so that the rubber ring 21a is placed in the gap between the top cover 70 and the rubber plate 23a, and the rubber ring 21a is placed in a suitable position. Since the rubber ring 21a is placed in a suitable position, a suitable amount of interference (thickness of rubber) can be arranged between the top cover 70 and the metal plate 23a. When the rubber ring 21a is crushed between the top cover 70 and the metal plate 23a, waterproofing properties can be secured by the suitable amount of interference.

Figure 11:
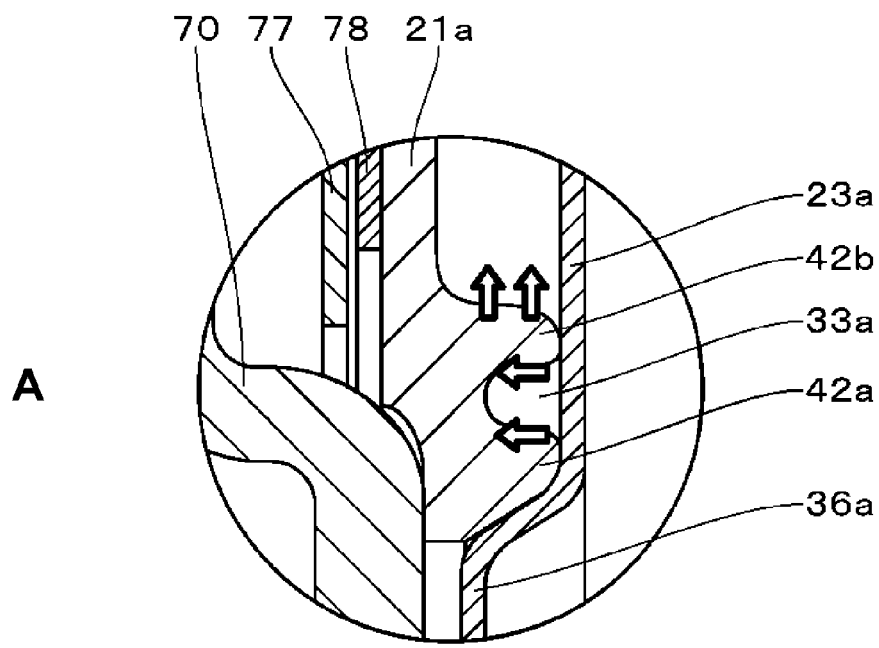
FIGS. 11A and 11B are partially enlarged views for describing a deformed state of the rubber ring.
Figure 11:
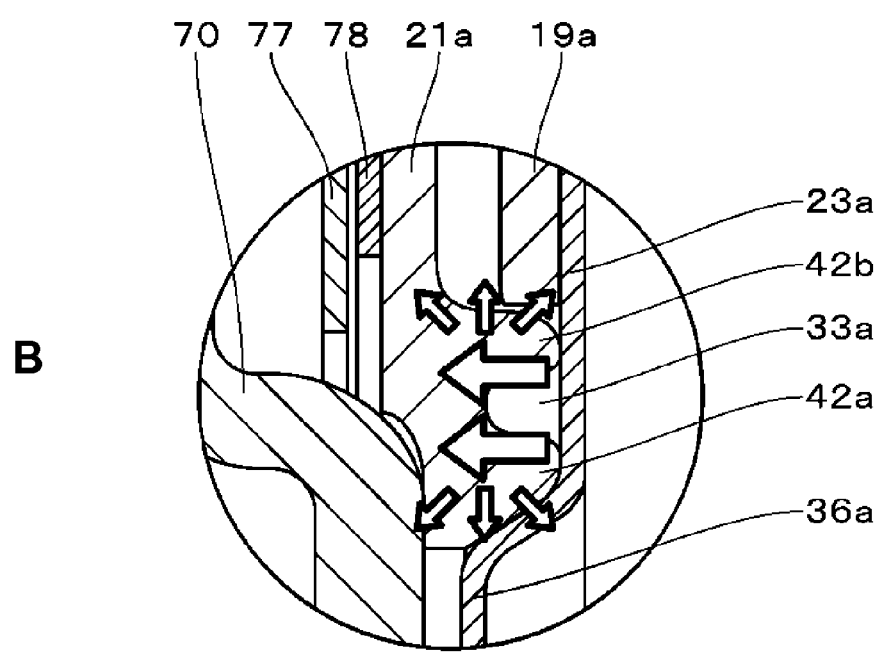

When the battery holder 18a is absent and the peripheral surface of the opening 33a is not formed, the rubber ring 21a slides on the top cover 70 by pressure from the metal plate 23a, and thus the rubber ring 21a may fall out from the top cover 70. This state is schematically shown in FIG. 11A. However, as shown in FIG. 11B, the peripheral surface of the protrusion section 42b of the rubber ring 21a is restricted by the peripheral surface of the opening 33a. For this reason, when the metal plate 23a is pressed, the movement of the rubber ring 21a in a direction separated from the top cover 70 is restricted. Accordingly, it is possible to prevent the rubber ring 21a from falling out from the top cover 70. In addition, a chamfering process may be performed in the end section of the peripheral surface of the opening 33a.

2. Modified Example

As mentioned above, although the embodiments have been described, the contents of the present disclosure are not limited to the embodiments mentioned above. Hereinafter, modified examples will be described.

It should be understood by those skilled in the art that various modifications, combinations, sub-combinations and alterations may occur depending on design requirements and other factors insofar as they are within the scope of the appended claims or the equivalents thereof.

Figure 12:
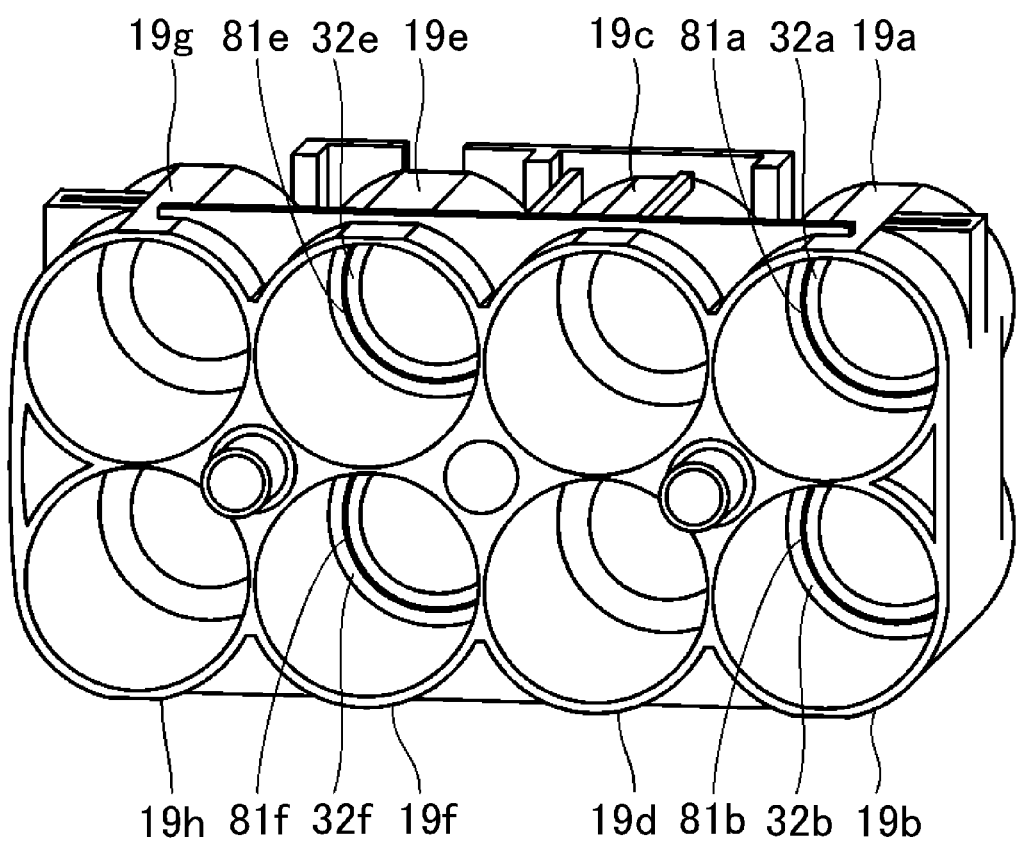
FIG. 12 is a schematic diagram showing a modified example of the battery holder.

For the battery holder 18a and the battery holder 18b, protrusions may be formed on the inner surface of the battery cell receiving section 19. As shown in FIG. 12, for example, a protrusion section 81a is formed on an inner surface 32a of the battery cell receiving section 19a into which the positive electrode terminal section of the battery cell 16 is inserted. A protrusion section 81b is formed on an inner surface 32b of the battery cell receiving section 19b. A protrusion section 81e is formed on an inner surface 32e of the battery cell receiving section 19e. A protrusion section 81f is formed on an inner surface 32f of the battery cell receiving section 19f. When there is no need to distinguish the individual protrusion sections, the protrusion sections are referred to as a protrusion section 81. For example, the protrusion section 81 is formed in a substantially circular shape. A plurality of protrusion sections may be formed on the inner surface 32 of the end section of the battery cell receiving section 19.

Figure 13:
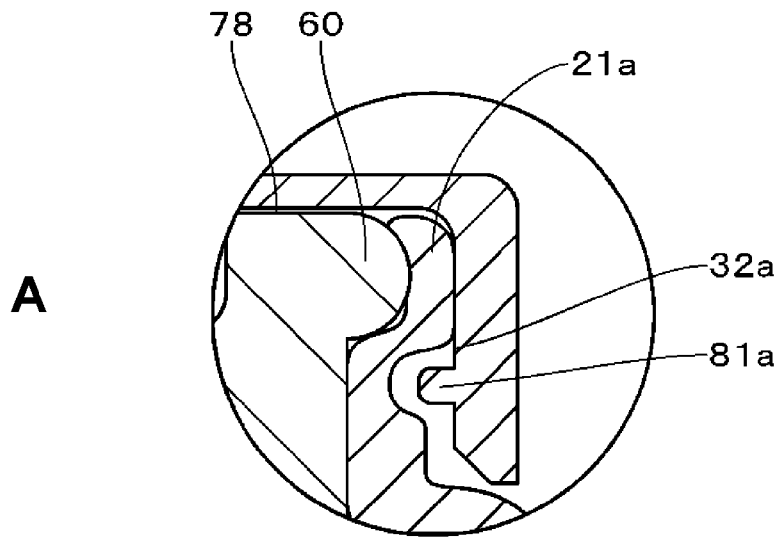
FIGS. 13A and 13B are partially enlarged views showing an example of a cross-section of a battery holder in a modified example.
Figure 13:
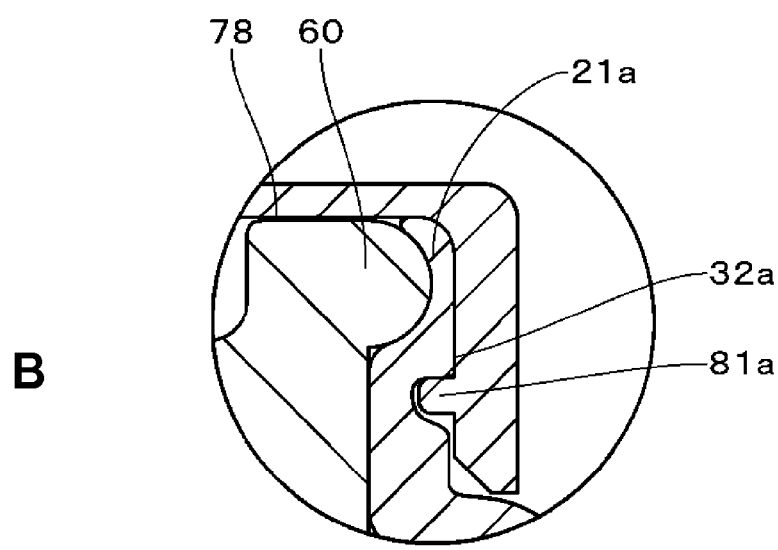

As shown in partially enlarged views of FIGS. 13A and 13B, for example, the rubber ring 21a is crushed by the protrusion section 81a. In addition, in FIGS. 13A and 13B, in order to simplify the description, configurations are partially simply shown. Particularly, adherence between the protrusion section 81a and the rubber ring 21a is improved by being crushed by the protrusion section 81a, and thus it is possible to prevent an unnecessary gap from being formed. Compared to a case in which the inner surface 32a crushes the rubber ring 21a over the entire surface, pressure crushing the rubber ring 21a can be made locally strong. For this reason, the rubber ring 21a is easily deformed, and thus adherence between the periphery of the protrusion section 81a and the rubber ring 21a can be improved.

Figure 14:
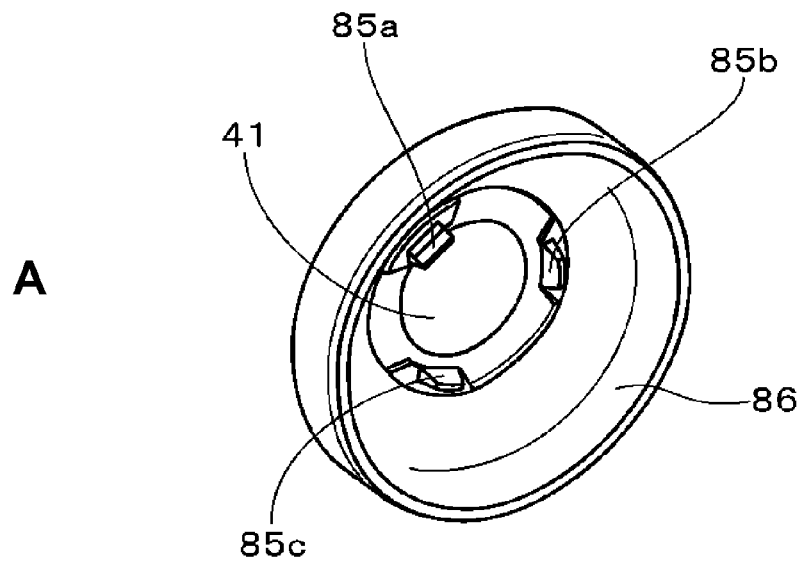
FIGS. 14A and 14B are schematic diagrams for describing a modified example of a rubber ring, and a state in which a rubber ring in a modified example is attached to the battery cell.
Figure 14:
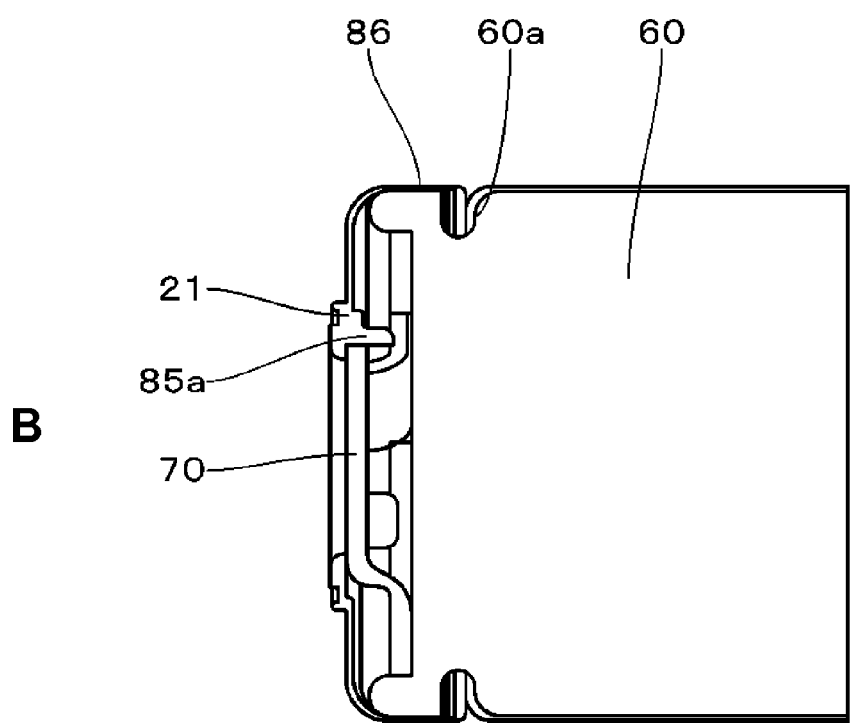

The rubber ring 21 may be freely attachable to or detachable from the vicinity of the positive electrode terminal section of the battery cell 16. As shown in FIG. 14A, a positioning rib is formed around the hole section 41 of the rubber ring 21 in a modified example. For example, a rib 85a, a rib 85b and a rib 85c are formed. A wall section 86 is erected around the rubber ring 21. A projection section is formed in a tip of the wall section 86.

As shown in FIG. 14B, the rubber ring 21 is mounted on the battery cell 16. That is, the rib 85a, the rib 85b and the rib 85c can be inserted into a gap around the top cover 70. Accordingly, the rubber ring 21 is positioned. The projection section formed in the tip of the wall section 86 of the rubber ring 21 is mounted on the convex section 60a of the battery container 60. The projection section of the tip of the wall section 86 and the concave section 60a form an undercut. Since the periphery of the top cover 70 of the battery cell 16 is sealed by the rubber ring 21, it is possible to prevent the flooding from the gap around the top cover 70.

Figure 15:
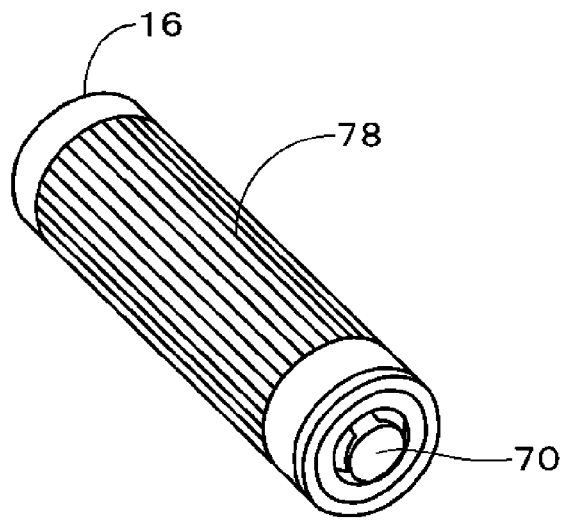
FIGS. 15A and 15B are schematic diagrams showing a modified example of the battery cell.
Figure 15:
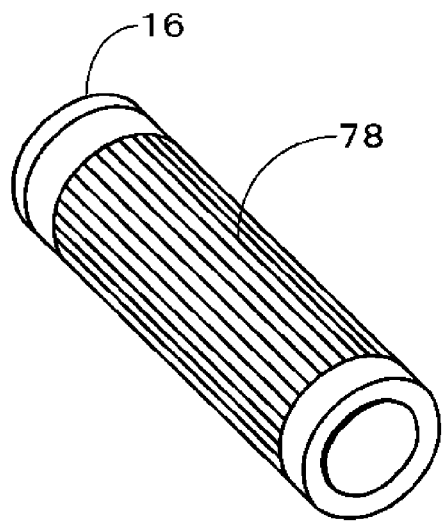

In order to prevent the flooding from the negative electrode terminal section via the resin tube 78, the resin tube near the positive electrode terminal section may be removed. For example, as shown in FIG. 15A, the resin tube near the positive electrode terminal section is cut. In order to prevent the short circuit, the resin tube 78 is coated on the peripheral surface near the central section of the battery container 60. Since the resin tube is cut, there is no need for a ring washer. For this reason, the cost of the battery cell can be reduced. As shown in FIG. 15B, the resin tube near the negative electrode terminal section may be cut. Since the resin tube is cut, the whole size of the battery cell can be reduced.

In addition, the configuration and the processing in the embodiments and the modified examples mentioned above can be suitably combined as long as no technical contradiction occurs. The materials, the numerical values, the assembling method or the like mentioned above are examples and the present disclosure is not limited thereto.

Additionally, the present application may also be configured as below.

(1) A battery pack comprising:
    an exterior case formed with one or more hole sections;
    a battery cell in which a positive electrode terminal section is formed on one end surface thereof and a negative electrode terminal section is formed on the other end surface thereof;
    a battery holder having a plurality of battery cell receiving sections receiving the battery cell; and
    a metal plate joined to the battery holder and formed with a terminal contact section,
    wherein an end of the battery cell receiving section is opened, and an end section having an opening is formed in the other end of the battery cell receiving section, an elastic body having an opening is placed between the one end surface of the battery cell and the end section of the battery cell receiving section, a predetermined portion of the elastic body is constricted by an end surface near the positive electrode terminal section and an inner surface of the end section, and a portion of the elastic body exposed from the opening of the battery cell receiving section is constricted by the positive electrode terminal section and the metal plate near the terminal contact section.

(2) The battery pack according to (1), wherein the terminal contact section is formed by drawing the metal plate.

(3) The battery pack according to (1) or (2), wherein one or more protrusion sections are formed on one surface of the elastic body.

(4) The battery pack according to (3), wherein a plurality of protrusion sections with different thicknesses are formed on a surface pressure-welded to the inner surface in the elastic body and on a surface pressure-welded to the metal plate in the elastic body.

(5) The battery pack according to any one of (1) to (4), wherein one or more protrusion sections are formed on the inner surface of the battery cell receiving section.

(6) The battery pack according to any one of (1) to (5), wherein the opening of the elastic body is smaller than the size of the opening of the end section, and is substantially the same as the size of the terminal contact section.

(7) The battery pack according to any one of (1) to (6), wherein the opening of the elastic body includes a first opening, and a second opening which communicates with the first opening and is smaller than the size of the first opening, the size of the first opening is set to be substantially the same as the size of the terminal contact section, and the second opening is set to be substantially the same as the size of the positive electrode terminal section.

(8) An electricity accumulation system, wherein the battery pack according to any one of (1) to (7) is charged by a power generator which performs power generation from renewable energy.

(9) An electricity accumulation system, wherein an electronic instrument connected to the battery pack according to any one of (1) to (7) is supplied with electric power from the battery pack.

(10) An electronic instrument which is supplied with electric power from the battery pack according to any one of (1) to (7).

(11) An electric vehicle comprising:

a conversion device that is supplied with electric power from the battery pack according to any one of (1) to (7) and converts the electric power into driving force of a vehicle; and a control device that performs information processing about a vehicle control based on information about the electricity accumulation system.

(12) An electric power system comprising:

an electric power information transmission and reception section that transmits and receives signals to and from another instrument via a network, wherein the system performs charging and discharging control of the battery pack according to any one of (1) to (7) based on information received by the electric power transmission and reception section.

(13) An electric power system which is supplied with electric power from the battery pack according to any one of (1) to (7) or supplies electric power to the battery pack from a power generator or a power network.

3. Application Example

Hereinafter, an application example of the electricity accumulation system will be described. However, the application example of the electricity accumulation system is not limited to the application example described blow.

Electricity Accumulation System in House as Application Example

Figure 16:
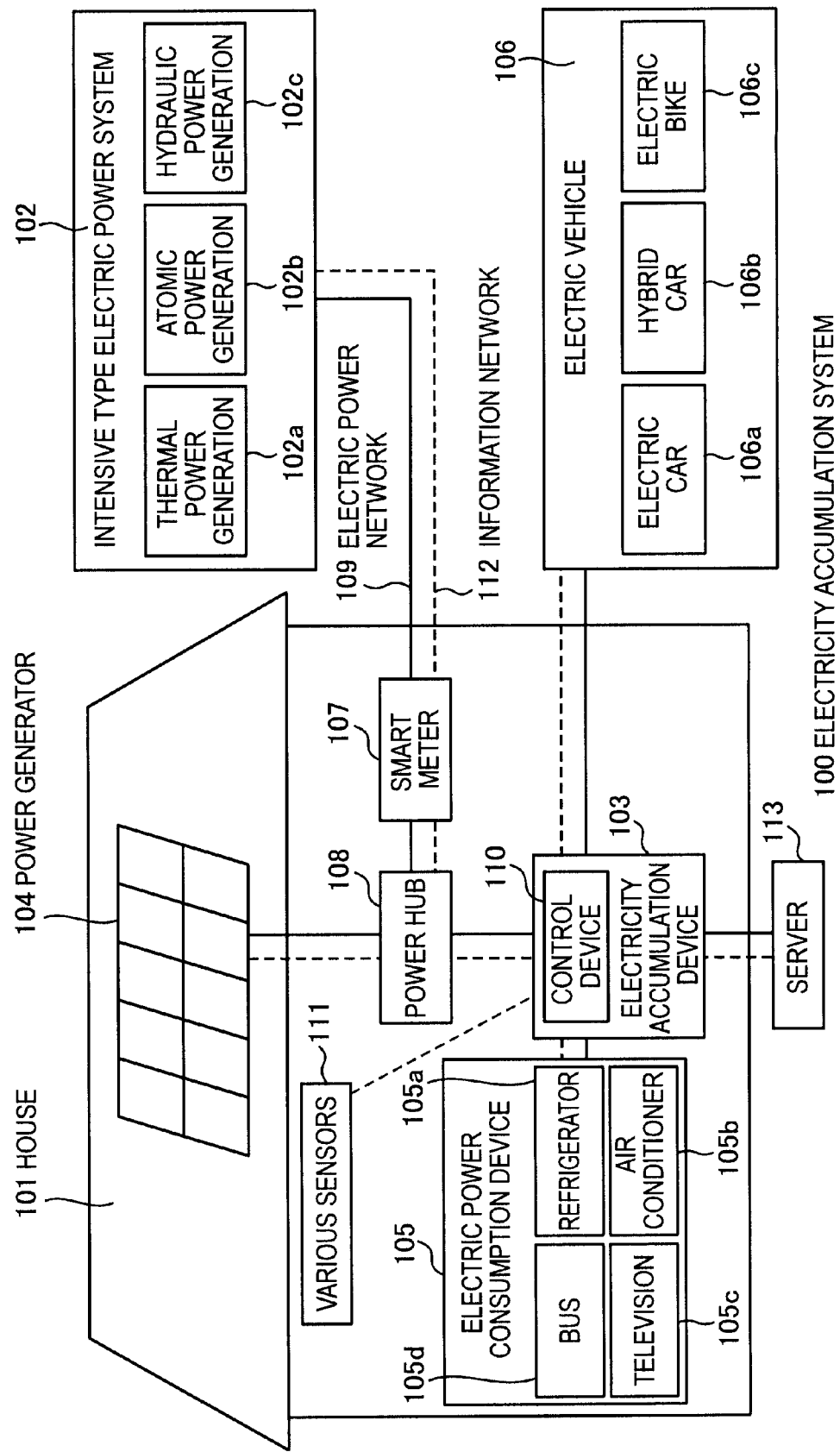
FIG. 16 is a block diagram for describing an application example of the battery pack.

An example in which the battery pack of the present disclosure is applied to the electricity accumulation system for a house will be described with reference to FIG. 16. For example, in an electricity accumulation system 100 for a house 101, electric power is supplied from intensive type electric power systems 102 such as thermal power generation 102a, nuclear power generation 102b and hydraulic power generation 102c via an electric power network 109, an information network 112, a smart meter 107, a power hub 108 or the like to an electricity accumulation device 103. Along with this, electric power is supplied from an independent power source such as an in-home electrical generator 104 to the electricity accumulation device 103. Electric power supplied to the electricity accumulation system 103 is accumulated. Electric power used in the house 101 is supplied using the electricity accumulation device 103. The same electricity accumulation system can also be used in other buildings without being limited to the house 101.

The electrical generator 104, an electric power consumption device 105, the electricity accumulation device 103, a control device 110 which controls each device, the smart meter 107, and a sensor 111 acquiring a variety of information are provided in the house 101. The respective devices are connected by the electric power network 109 and the information network 112. As the electrical generator 104, a solar battery, a fuel battery, a windmill or the like are used, and the generated electric power is supplied to the electric power consumption device 105 and/or the electricity accumulation device 103. The electric power consumption device 105 includes a refrigerator 105a, an air conditioner 105b, a television receiver 105c, a bath 105b or the like. In addition, the electric power consumption device 105 includes an electric vehicle 106. The electric vehicle 106 includes an electric car 106a, a hybrid car 106b, and an electric motorcycle 106c. The electric vehicle 106 may be an electric-assist bicycle.

The electricity accumulation device 103 is constituted by a secondary battery or a capacitor. For example, the device is constituted by a lithium ion secondary device. The lithium ion secondary device may be a stationary type and may be used in the electric vehicle 106. The battery pack of the present disclosure mentioned above is able to be applied to the electricity accumulation device 103. The smart meter 107 has a function of detecting an amount of use of commercial electric power and transmitting the detected amount of use to an electric power company. The electric power network 109 may be any one of direct current feeding, alternating current feeding, and non-contact feeding or a combination thereof.

Various sensors 111 include, for example, a person detection sensor, a luminance sensor, an object detection sensor, a power consumption sensor, a vibration sensor, a contact sensor, a temperature sensor, an infrared sensor or the like. Information acquired by the various sensors 111 is transmitted to the control device 110. A meteorological state, the state of the person or the like is discerned using information from the sensors 111, the power consumption device 105 is automatically controlled, and thus energy consumption can be minimized. In addition, the control device 110 can transmit information about the house 101 to an external electric power company or the like via the Internet.

Processing such as branching of the electric power line and the direct current to alternating current conversion is performed by a power hub 108. Communication types of the information network 112 connected to the control device 110 include a method of using a communication interface such as a UART (Universal Asynchronous Receiver Transmitter: transmission and reception circuit for asynchronous serial communication), and a method of using a sensor network using a radio communication standard such as Bluetooth (registered trademark), ZigBee, or Wi-Fi. The Bluetooth type is applied to multimedia communication and is able to perform communication of point-to-multipoint connection. ZigBee uses a physical layer of iEEE (Institute of Electrical and Electronics Engineers) 802.15.4. iEEE802.15.4 is a name of a short distance wireless network standard known as PAN (Personal Area Network) or W (Wireless) PAN.

The control device 110 is connected to an external server 113. The server 113 may be controlled by any of the house 101, the electric power company, and a service provider. Information transmitted and received by the server 113 includes, for example, power consumption information, life pattern information, an electricity rate, weather information, natural disaster information, and information about an electricity transaction. Such information may be transmitted or received from the power consumption device (for example, a television receiver) in the home, or may be transmitted or received from a device outside the home (for example, a mobile phone or the like). Such information may be displayed on an instrument having a display function, for example, a television receiver, a mobile phone, a PDA (Personal digital assistant) or the like.

The control device 110 controlling each portion is constituted by a CPU, a RAM, a ROM or the like. In the present embodiment, the control device 110 is stored in the electricity accumulation device 103. The control device 110 is connected by the electricity accumulation device 103, the home electrical generator 104, the electric power consumption device 105, the various sensors 111, the server 113 and the information network 112, and has, for example, a function of adjusting an amount of use and an amount of power generation of the commercial electric power. In addition, the control device 110 may include a function of performing the electricity transaction in an electricity market.

As mentioned above, in addition to the intensive type electric power system 102 such as the thermal power, 102a, the atomic power 102b and the hydraulic power 102c, the generated electric power of the home electrical generator 104 (the solar power generation, and the wind power generation) can be accumulated in the electricity accumulation device 103. Thus, even when the generated electric power of the home electrical generator 104 fluctuates, it is possible to perform control such as regularizing the amount of electric power sent to the outside or discharging electricity as necessary. For example, in addition to accumulating the electric power obtained by the solar power generation in the electricity accumulation device 103, the accumulation device may also be used to accumulate late-night electricity at an inexpensive rate during the night, and the electric power accumulated in the electricity accumulation device 103 may be discharged in the daytime when the rate is expensive.

In addition, in the present embodiment, although an example in which the control device 110 is stored in the electricity accumulation device 103 has been described, the control device 110 may be stored in the smart meter 107 and may be individually constituted. In addition, the electricity accumulation system 100 may be used for a plurality of families in an apartment complex or may be used for a plurality of separate houses.

Electricity Accumulation System in Vehicle as Application Example

Figure 17:
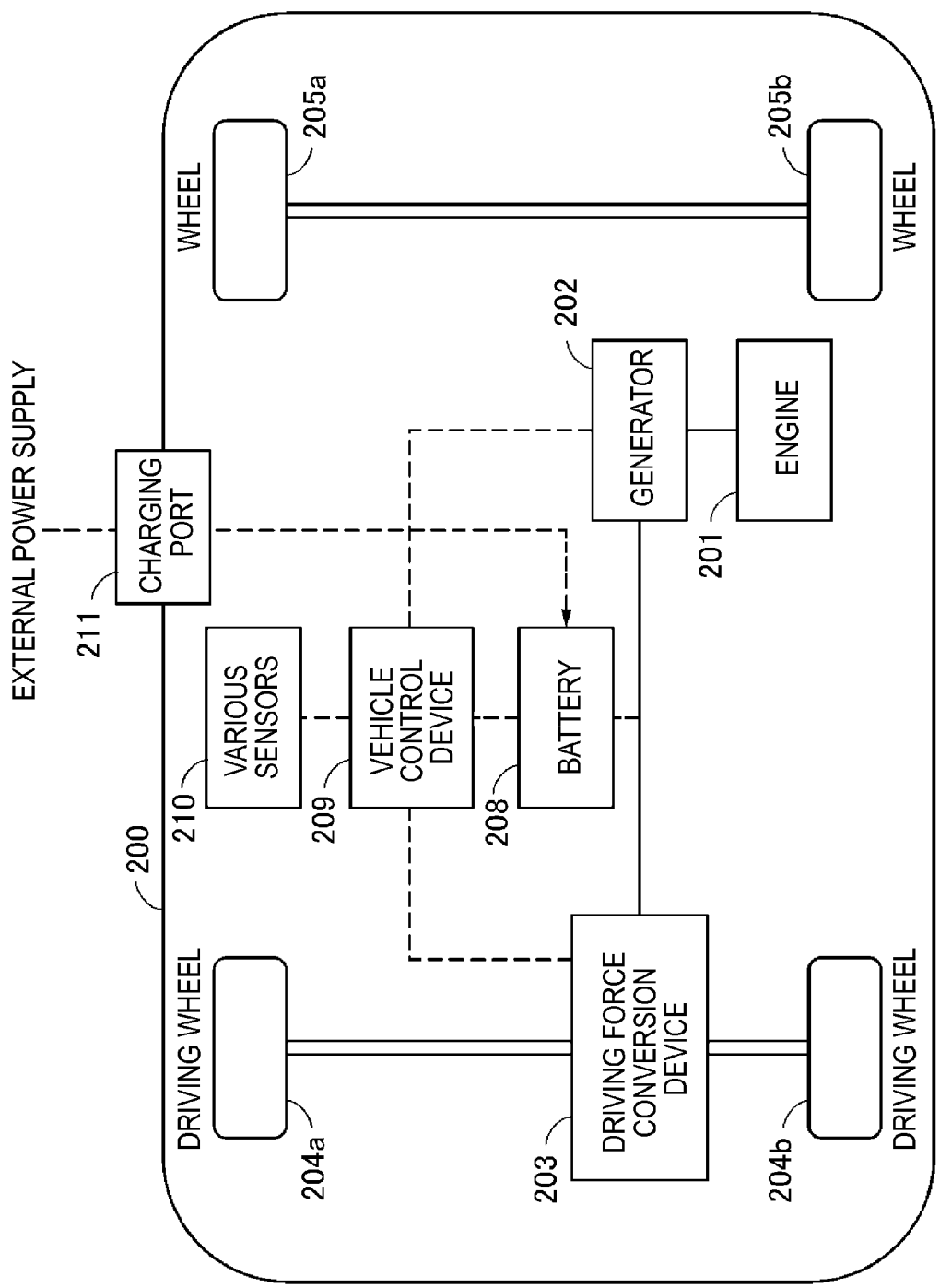
FIG. 17 is a block diagram for describing another application example of the battery pack.

An example in which the present disclosure is applied to the electricity accumulation system for the vehicle will be described with reference to FIG. 17. FIG. 17 schematically shows an example of a configuration of the hybrid vehicle adopting the hybrid system to which the present disclosure is applied. A series hybrid system is a car which runs by an electric power driving force conversion device using electric power generated by a generator moved by an engine or electric power accumulated in the battery once.

An engine 201, a generator 202, an electric power to driving force conversion device 203, a driving wheel 204a, a wheel 205a, a wheel 205b, a battery 208, a vehicle control device 209, various sensors 210, and a charging port 211 are mounted on the hybrid vehicle 200. The battery pack of the present disclosure mentioned above is applied to the battery 208.

The hybrid vehicle 200 runs using the electric power to driving force conversion device 203 as a power source. An example of the electric power to driving force conversion device 203 is a motor. The electric power to driving force conversion device 203 is operated using the electric power of the battery 208, and rotational power of the electric power to driving force conversion device 203 is transmitted to the driving wheels 204a and 204b. In addition, by using direct current-alternating current (DC-AC) or inverse conversion (AC-DC conversion) in a required location, the electric power to driving force conversion device 203 can also be applied to the alternating motor and the direct current motor. The various sensors 210 control the number of revolutions of the engine via the vehicle control device 209 or control an aperture of a throttle valve (not shown) (a throttle aperture). The various sensors 210 include a speed sensor, an accelerator sensor, an engine revolution sensor or the like.

The rotational force of the engine 201 is transmitted to the generator 202, and thus the electric power generated by the generator 202 by the rotational force can be accumulated in the battery 208.

When the hybrid vehicle is decelerated by a braking mechanism (not shown), resistance force at the time of the speed reduction is added to the electric power to driving force conversion device 203 as the rotational force, and the regeneration electric power generated by the electric power to driving force conversion device 203 by the rotational force is accumulated in the battery 208.

The battery 208 is supplied with electric power from the external power source using the charging port 211 as an input port and is able to accumulate the received electric power as the hybrid vehicle is connected to the external power source.

Although it is not shown, an information processing device, which performs information processing about the vehicle control based on information about the secondary battery, may be included. Such an information processing device includes, for example, an information processing device or the like, which performs a battery residual quantity display based on information about a residual quantity of the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack having an exterior case formed with one or more hole sections, the battery pack comprising:
    a battery cell in which a positive electrode terminal section is formed on one end surface thereof and a negative electrode terminal section is formed on the other end surface;
    a battery holder having a plurality of battery cell receiving sections receiving the battery cell; and
    a metal plate joined to the battery holder and formed with a terminal contact section,
    wherein an end of the battery cell receiving sections is opened, and an end section having an opening is formed in the other end of the battery cell receiving sections,
    an elastic body having an opening is placed between the one end surface of the battery cell and the end section of the battery cell receiving sections,
    a predetermined portion of the elastic body is constricted by an end surface near the positive electrode terminal section and an inner surface of the end section, and
    a portion of the elastic body exposed from the opening of the battery cell receiving sections is constricted by the positive electrode terminal section and the metal plate near the terminal contact section.

2. The battery pack according to claim 1, wherein the terminal contact section is formed by drawing the metal plate.

3. The battery pack according to claim 1, wherein one or more protrusion sections are formed on one surface of the elastic body.

4. The battery pack according to claim 3, wherein a plurality of protrusion sections with different thicknesses are formed on a surface pressure-welded to the inner surface in the elastic body and on a surface pressure-welded to the metal plate in the elastic body.

5. The battery pack according to claim 1, wherein one or more protrusion sections are formed on the inner surface of the battery cell receiving section.

6. The battery pack according to claim 1, wherein the opening of the elastic body is smaller than the size of the opening of the end section, and is substantially the same as the size of the terminal contact section.

7. The battery pack according to claim 1, wherein the opening of the elastic body includes a first opening, and a second opening which communicates with the first opening and is smaller than the size of the first opening, the size of the first opening is set to be substantially the same as the size of the terminal contact section, and the second opening is set to be substantially the same as the size of the positive electrode terminal section.

8. An electricity accumulation system, wherein the battery pack according to claim 1 is charged by a power generator which performs power generation from renewable energy.

9. An electricity accumulation system, wherein an electronic instrument connected to the battery pack according to claim 1 is supplied with electric power from the battery pack.

10. An electronic instrument which is supplied with electric power from the battery pack according to claim 1.

11. An electric vehicle comprising:
    a conversion device that is supplied with electric power from the battery pack according to claim 1 and converts the electric power into driving force of a vehicle; and
    a control device that performs information processing about a vehicle control based on information about the electricity accumulation system.

12. An electric power system comprising:
    an electric power information transmission and reception section that transmits and receives signals to and from another instrument via a network, wherein the system performs charging and discharging control of the battery pack according to claim 1 based on information received by the electric power transmission and reception section.

13. An electric power system which is supplied with electric power from the battery pack according to claim 1 or supplies electric power to the battery pack from a power generator or a power network.

* * * * *